United States Patent
Hayashi et al.

(10) Patent No.: US 7,101,593 B2
(45) Date of Patent: Sep. 5, 2006

(54) METHOD FOR PRODUCING A DISK-SHAPED SUBSTRATE AND METHOD FOR PRODUCING AN OPTICAL DISK

(75) Inventors: Kazuhiro Hayashi, Kadoma (JP); Kazuya Hisada, Osaka (JP); Eiji Ohno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/258,702

(22) PCT Filed: Apr. 24, 2001

(86) PCT No.: PCT/JP01/03544

§ 371 (c)(1),
(2), (4) Date: Oct. 24, 2002

(87) PCT Pub. No.: WO01/86648

PCT Pub. Date: Nov. 15, 2001

(65) Prior Publication Data

US 2003/0099770 A1 May 29, 2003

(30) Foreign Application Priority Data

Apr. 25, 2000 (JP) .................. 2000-124219
Jun. 9, 2000 (JP) .................. 2000-173134
Sep. 12, 2000 (JP) .................. 2000-275987

(51) Int. Cl.
*C08F 2/46* (2006.01)

(52) U.S. Cl. .................. 427/487; 156/349; 156/376.6; 156/510; 156/584; 427/128; 427/131; 427/132; 427/164; 427/240; 427/246; 427/289; 427/385.5; 427/404; 427/407.1; 427/532; 427/585; 427/595

(58) Field of Classification Search .................. 156/349, 156/376.6, 510, 584; 427/487, 128, 131, 427/132, 164, 240, 246, 289, 385.5, 404, 427/407.1, 532, 585, 595
See application file for complete search history.

(56) References Cited

U.S. PATENT DOCUMENTS

| 4,443,806 | A |   | 4/1984 | Ando |
|---|---|---|---|---|
| 4,790,893 | A |   | 12/1988 | Watkins |
| 4,877,475 | A | * | 10/1989 | Uchida et al. .......... 156/273.7 |
| 4,897,829 | A |   | 1/1990 | Ikoma et al. |
| 5,198,263 | A | * | 3/1993 | Stafford et al. .......... 427/577 |
| 5,328,816 | A |   | 7/1994 | Tamura et al. |
| 5,384,758 | A |   | 1/1995 | Matsumoto .......... 369/13.41 |
| 5,643,423 | A |   | 7/1997 | Kimock et al. |

(Continued)

FOREIGN PATENT DOCUMENTS

DE           195 44145         5/1997

(Continued)

*Primary Examiner*—Timothy Meeks
*Assistant Examiner*—Wesley D. Markham
(74) *Attorney, Agent, or Firm*—Hamre, Schumann, Mueller & Larson, P.C.

(57) ABSTRACT

A method for producing a disk-shaped substrate 10 used for producing an optical disk includes: (a) forming a protective layer 12a that is larger in area than the disk-shaped substrate 10 on a surface of a transparent plate 11a; and (b) cutting a portion of the plate 11a with the protective layer 12a formed thereon other than an outer edge portion of the protective layer 12a to form a disk shape. According to this producing method, a thin substrate can be prevented from being damaged by forming a protective layer. Furthermore, according to this producing method, a protective layer with a uniform thickness can be formed.

6 Claims, 17 Drawing Sheets

U.S. PATENT DOCUMENTS

| | | | |
|---|---|---|---|
| 5,750,210 A | | 5/1998 | Schmidt et al. |
| 5,951,806 A | * | 9/1999 | Amo et al. ............... 156/273.5 |
| 5,972,250 A | * | 10/1999 | Miyamoto et al. ............ 264/1.7 |
| 6,013,145 A | * | 1/2000 | Amo et al. .................... 156/74 |
| 6,117,284 A | * | 9/2000 | Mueller ................. 204/192.27 |
| 6,122,764 A | * | 9/2000 | Kobayashi ................... 714/758 |
| 6,224,702 B1 | * | 5/2001 | Kitano et al. ................. 156/74 |
| 6,345,034 B1 | * | 2/2002 | Kim ........................ 369/275.5 |
| 6,416,609 B1 | * | 7/2002 | Imada et al. ................. 156/245 |
| 6,500,511 B1 | * | 12/2002 | Ooki et al. ................. 428/64.1 |
| 6,555,182 B1 | * | 4/2003 | Tonosaki et al. ............ 427/525 |
| 6,613,396 B1 | * | 9/2003 | Nishida et al. .............. 427/512 |
| 6,663,935 B1 | * | 12/2003 | Kashiwagi et al. ........ 428/64.2 |

FOREIGN PATENT DOCUMENTS

| | | |
|---|---|---|
| EP | 0 627 734 | 12/1994 |
| EP | 0 385 341 | 9/1999 |
| EP | 1 152 407 | 11/2001 |
| JP | 57-66541 | 4/1982 |
| JP | 58-45637 | 3/1983 |
| JP | 62-287450 | 12/1987 |
| JP | 2-10537 | 1/1990 |
| JP | 02-122520 A | 5/1990 |
| JP | 2-12042 | 7/1990 |
| JP | 3-102658 | 4/1991 |
| JP | 3-185642 | 8/1991 |
| JP | 5-151618 | 6/1993 |
| JP | 6-259811 | 9/1994 |
| JP | 08-124222 A * | 5/1996 |
| JP | 9-147425 | 6/1997 |
| JP | 9-237439 | 9/1997 |
| JP | 64-1588 | 1/1998 |
| JP | 3-144940 | 6/1999 |
| JP | 11-185303 | 7/1999 |
| JP | 11-185313 | 7/1999 |
| JP | 11-232701 | 8/1999 |
| JP | 2000-25370 | 1/2000 |
| JP | 2000-36135 | 2/2000 |
| JP | 2000-67466 | 3/2000 |
| JP | 2000-82237 A * | 3/2000 |
| JP | 2001-43569 | 2/2001 |

* cited by examiner

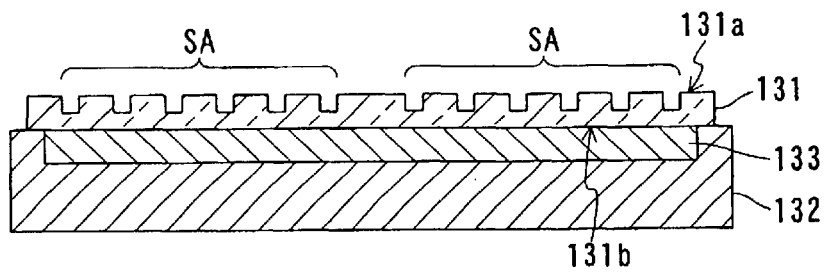
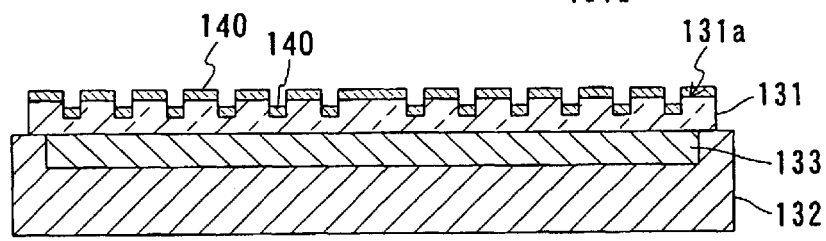
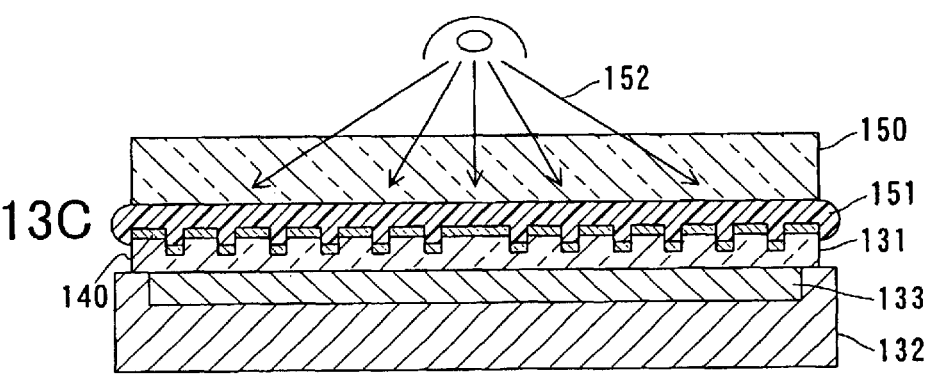
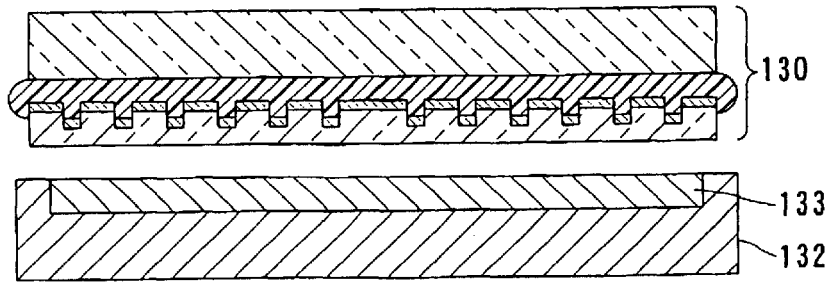
Fig. 13A
Fig. 13B
Fig. 13C
Fig. 13D

METHOD FOR PRODUCING A DISK-SHAPED SUBSTRATE AND METHOD FOR PRODUCING AN OPTICAL DISK

TECHNICAL FIELD

The present invention relates to a method for producing a disk-shaped substrate, a method for producing an optical disk and an apparatus for producing an optical disk

BACKGROUND ART

Optical disks are spreading widely as information recording media for reproducing or recording information using laser light. Optical disks can be classified as a read-only type, a write-once type and a rewritable type. Examples of the read-only optical disks include compact disks and laser disks. Write-once or rewritable optical disks are used as information recording media. Some of these optical disks have a configuration in which an information layer is formed on one principal plane of a transparent substrate (thickness: 1.2 mm) and a protective film is formed thereon.

In recent years, a digital versatile disk (DVD) that is an optical disk with a large capacity has been commercialized. In recording/reproducing of a high-density optical disk such as a DVD, laser light with a short wavelength and an objective lens with a large numerical aperture (NA) are used. More specifically, laser light with a wavelength of 650 nm and an objective lens with a NA of 0.60 are used. The thickness of a substrate on a light-incident side of a DVD is 0.6 mm. When using one resin substrate having a thickness of 0.6 mm, the mechanical strength is low and tilt occurs, so that a DVD is formed by attaching two substrates to each other with information recording surfaces placed inside. Herein, the term "tilt" refers to an inclination between an optical axis of laser light incident upon an optical disk for recording/reproducing and a normal line to an information recording surface of the optical disk.

In order to increase further the density of information to be recorded onto an optical disk, the use of a blue purple laser light source (wavelength: about 400 nm) also is proposed. In this case, the thickness of a transparent resin layer from the surface of a substrate to a reflective layer is set to be about 0.1 mm, and a fine laser spot is formed by using a lens with a NA of about 0.85, whereby a signal is recorded/reproduced. However, a decrease in the wavelength of laser light and an increase in a NA of the objective lens decrease an acceptable value of tilt. In order to increase the acceptable value of tilt, it is effective to decrease the thickness of the resin layer on a light-incident side.

As a method for producing an optical disk in which a resin layer on a light-incident side is thin (e.g., 0.1 mm), a signal recording layer is formed on a substrate with a thickness of 1.1 mm, and a thin resin sheet is attached to the signal recording layer or the signal recording layer is coated with UV-curable resin. There also is a method in which, after the signal recording layer is formed on the thin resin sheet, the resin sheet and the thick substrate are attached to each other.

The present invention relates to an optical disk that is formed by attaching two substrates to each other. More specifically, the object of the present invention is to provide a novel method for producing a disk-shaped substrate for use in production of an optical disk, a novel method for producing an optical disk and a novel apparatus for producing an optical disk.

DISCLOSURE OF INVENTION

In order to achieve the above-mentioned object, a method for producing a disk-shaped substrate of the present invention is used for producing an optical disk, including the processes of:

(a) forming a protective layer that is larger in area than the disk-shaped substrate on a surface of a transparent plate; and (b) cutting a portion of the plate with the protective layer formed thereon other than an outer edge portion of the protective layer to form a disk shape. According to this producing method, a thin substrate can be prevented from being damaged by forming a protective layer. Furthermore, according to this producing method, a protective layer with a uniform thickness can be formed.

According to the above-mentioned method for producing a substrate, a thickness of the plate may be in a range of 0.03 mm to 0.3 mm. According to this configuration, in particular, an optical disk capable of performing high-density recording can be obtained.

According to the above-mentioned method for producing a substrate, the protective layer may be made of radiation-curable resin. In the present specification, "radiation" is intended to include all of the electromagnetic waves and particle waves, for example, UV-light and an electron beam. The radiation-curable resin refers to resin that is cured by irradiation with these radiations.

According to the above-mentioned method for producing a substrate, the plate may have a disk shape with a diameter larger than that of the disk-shaped substrate. According to this configuration, a plate can be handled easily.

According to the above-mentioned method for producing a substrate, the process (a) may include coating the plate with the radiation-curable resin by spin coating, and curing the radiation-curable resin. According to this configuration, in particular, a disk-shaped substrate can be produced easily.

According to the above-mentioned method for producing a substrate, the protective layer may be made of a material with a hardness higher than that of the plate. According to this configuration, a substrate can be prevented from being damaged.

According to the above-mentioned method for producing a substrate, the protective layer may be made of a material with a coefficient of friction smaller than that of the plate. According to this configuration, since heat is unlikely to be generated even if a pickup head and a substrate come into contact with each other, the substrate can be prevented from being damaged.

According to the above-mentioned method for producing a substrate, the protective layer may be made of an inorganic substance, and the protective layer may be formed by chemical vapor deposition in the process (a). According to this configuration, a protective layer with a uniform thickness can be formed on a thin plate with a large area.

According to the above-mentioned method for producing a substrate, the process (a) further may include forming an inorganic layer made of an inorganic substance on the protective layer. According to this configuration, in particular, a substrate can be prevented from being damaged by using a protective layer with a high hardness and an inorganic layer with a small coefficient of friction.

Furthermore, a first producing method of the present invention is a method for producing an optical disk including a first substrate and a second substrate that is thinner than the first substrate, including the processes of:

(A) forming a protective film on one principal plane of the second substrate; and (B) attaching the first substrate and the second substrate to each other so that the protective film is placed outside.

According to the conventional producing method, there is a problem in that the surface of a second substrate to be a light incident side is likely to be damaged in the course of production or use. However, according to the first producing method of the present invention, the surface of a substrate on a light incident side can be prevented from being damaged.

According to the above-mentioned first producing method, the thickness of the second substrate may be in a range of 0.03 mm to 0.3 mm. According to this configuration, in particular, an optical disk capable of performing high-density recording can be produced.

The above-mentioned first producing method further may include the process of (C) removing the protective film from the second substrate after the process (B).

According to the above-mentioned first producing method, the process (A) may include forming a signal recording layer on the other principal plane opposed to the one principal plane after forming the protective film.

According to the above-mentioned first producing method, the first substrate and the second substrate may be attached to each other using radiation-curable resin in the process (B). According to this configuration, in particular, production becomes easy.

According to the above-mentioned first producing method, the protective film may have a flexural rigidity smaller than that of the second substrate.

According to the above-mentioned first producing method, the protective film may have a hardness higher than that of the second substrate or have a flexural rigidity larger than that of the second substrate. According to this configuration, a second substrate can be handled easily.

According to the above-mentioned first producing method, a first central hole may be formed in the first substrate, a second central hole may be formed in the second substrate, and the second central hole may be larger than the first central hole.

According to the above-mentioned first producing method, the second central hole may be larger than a clamp region. In the present specification, a "clamp region" refers to a region held for rotating an optical disk when the optical disk is used.

According to the above-mentioned first producing method, a thickness of the protective film may be 30 μm or more.

The above-mentioned first producing method further may include the processes of:

(a) forming the protective layer that is larger in area than the second substrate on a surface of a transparent plate; and (b) cutting a portion of the plate with the protective layer formed thereon other than an outer edge portion of the protective layer to form the second substrate, before the process (A). According to the above-mentioned configuration, a second substrate can be prevented from being damaged by forming a protective layer with a uniform thickness.

According to the above-mentioned first producing method, a thickness of the plate may be in a range of 0.03 mm to 0.3 mm.

According to the above-mentioned first producing method, the plate may have a disk shape with a diameter larger than that of the substrate.

According to the above-mentioned first producing method, the protective layer may be made of radiation-curable resin, and the process (a) may include coating the plate with the radiation-curable resin by spin coating, and curing the radiation-curable resin.

According to the above-mentioned first producing method, the protective layer may be made of a material with a hardness higher than that of the plate.

According to the above-mentioned first producing method, the protective layer may be made of a material with a coefficient of friction smaller than that of the plate.

Furthermore, a second producing method of the present invention is a method for producing an optical disk including a first substrate and a second substrate in which a signal area is to be formed on one principal plane, including the processes of:

(i) fixing the other principal plane of the second substrate, which is an opposite side of the one principal plane, to a support;

(ii) forming at least one film selected from a metal film, a dielectric film, a magnetic film and a coloring film on the one principal plane;

(iii) attaching the first substrate and the second substrate to each other with the at least one film interposed therebetween; and (iv) releasing the other principal plane of the second substrate from the support. According to the conventional producing method, there is a problem in that a warp and a wave may be caused in a second substrate when a metal film or the like is formed on the second substrate. In contrast, according to the second producing method of the present invention, an optical disk with less warp and wave can be produced easily. In the present specification, a "signal region" refers to a region where an information signal is recorded, and in this region, pits corresponding to an information signal, address pits for recording address information, or grooves for tracking servo control, a reflective film and the like are formed. Furthermore, a film made of a material that is changed in phase by irradiation with light, a magnetic film, a dielectric film, or the like is formed in the signal region, in accordance with a method for recording an information signal.

According to the above-mentioned second producing method, the thickness of the second substrate may be in a range of 0.03 mm to 0.3 mm.

According to the above-mentioned second producing method, the first substrate may include a signal area on one principal plane on a side that is attached to the second substrate. According to this configuration, an optical disk having a two-layered signal recording layer can be produced.

According to the above-mentioned second producing method, the first substrate and the second substrate may be attached to each other using radiation-curable resin in the process (iii).

According to the above-mentioned second producing method, the support and the second substrate may have radiation permeability, and the first substrate and the second substrate may be attached to each other by curing the radiation-curable resin by radiation from the support side in the process (iii). According to this configuration, even in the case where a first substrate has no radiation permeability, the first substrate and the second substrate can be attached to each other, and in particular, an optical disk having a two-layered signal recording layer can be produced easily.

The above-mentioned second producing method may include forming the signal area on the one principal plane of the second substrate after the process (i) and before the process (ii). According to this configuration, the signal region can be formed while the second substrate is kept flat, and pits or grooves for the signal region can be formed stably.

According to the above-mentioned second producing method, the second substrate may have a circular through-hole at a center thereof, and the process (i) may include pressing at least one selected from an inner peripheral edge and an outer peripheral edge of the second substrate to the support side by a pressure member, thereby fixing the other principal plane to the support.

Furthermore, a first producing apparatus of the present invention is an apparatus for producing an optical disk using a first substrate and a second substrate, including: attachment means for attaching the first substrate and the second substrate with a protective film formed on one principal plane to each other so that the protective film is placed outside; and peeling means for peeling the protective film. According to this producing apparatus, the first producing method of the present invention for producing an optical disk can be conducted easily.

The above-mentioned first producing apparatus further may include film-forming means for forming the protective film on the one principal plane of the second substrate.

In the above-mentioned first producing apparatus, the attachment means may include: coating means for coating at least one substrate selected from the first substrate and the second substrate with radiation-curable resin; stacking means for stacking the first substrate and the second substrate so that a center of the first substrate is matched with a center of the second substrate; and irradiation means for irradiating the radiation-curable resin with radiation.

In the above-mentioned first producing apparatus, the attachment means further may include rotation means for rotating the stacked first substrate and second substrate.

In the above-mentioned first producing apparatus, the coating means may include dropping means for dropping the radiation-curable resin onto the at least one substrate and rotation means for rotating the at least one substrate, and the stacking means may include a container that can be evacuated.

Furthermore, a second producing apparatus of the present invention is an apparatus for producing an optical disk including a first substrate and a second substrate in which a signal area is to be formed on one principal plane, including:
 a support for supporting the other principal plane of the second substrate, which is an opposite side of the one principal plane; and
 fixing means for fixing the other principal plane to the support.

According to the second producing apparatus, the second producing method of the present invention for producing an optical disk can be conducted easily.

The above-mentioned second producing apparatus further may include film-forming means for forming at least one film selected from a metal film, a dielectric film, a magnetic film and a coloring film on the one principal plane.

The above-mentioned second producing apparatus further may include attachment means for attaching the first substrate and the second substrate to each other.

In the above-mentioned second producing apparatus, the support may be made of a radiation-permeable material, and the attachment means includes irradiation means on a side opposite to a side where the second substrate is placed with respect to the support.

In the above-mentioned second producing apparatus, the second substrate may have a circular through-hole at a center thereof, and the fixing means may include pressure means for pressing at least one selected from an inner peripheral edge and an outer peripheral edge of the second substrate to the support side.

The second producing apparatus further may include signal area forming means for forming the signal area on the one principal plane of the second substrate.

BRIEF DESCRIPTION OF DRAWINGS

FIGS. 13A to 13D are cross-sectional views illustrating still another example of a method for producing an optical disk of the present invention.

EMBODIMENTS FOR CARRYING OUT THE INVENTION

Figure 1A:
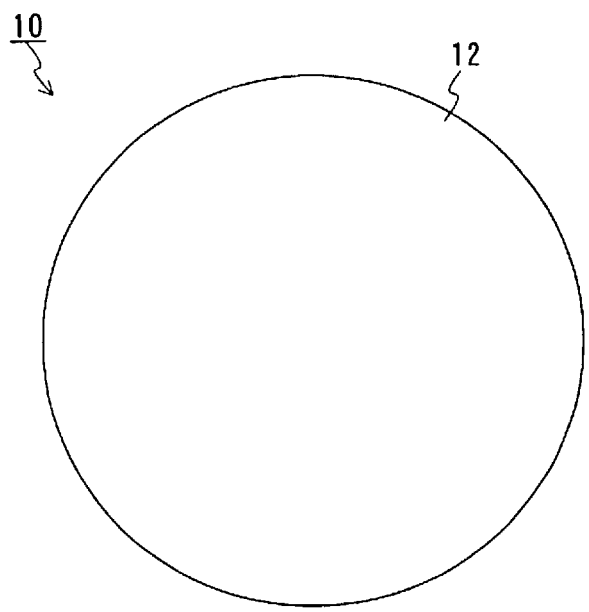
FIG. 1A is a plan view of a disk-shaped substrate produced by a producing method of the present invention.

Hereinafter, the present invention will be described by way of embodiments with reference to the drawings. In the following description, like parts will be denoted with like reference numerals, and a repeated description thereof may be omitted.

Embodiment 1

In Embodiment 1, an example of a method for producing a disk-shaped substrate used in the production of an optical disk will be described.

Figure 1B:
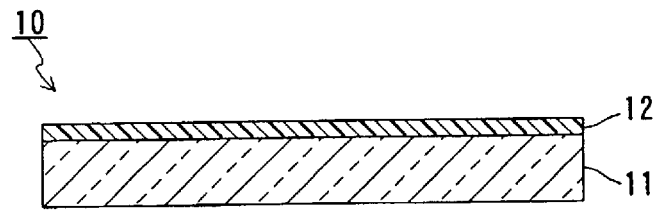
FIG. 1B is a central cross-sectional view of FIG. 1A.

First, FIG. 1A shows a plan view of a disk-shaped substrate 10 produced by the producing method, and FIG. 1B shows a central cross-sectional view thereof. Referring to FIGS. 1A and 1B, the substrate 10 includes a substrate 11 and a protective layer 12 formed on the substrate 11. A through-hole may be formed at the center of the substrate 10. Furthermore, an inorganic layer made of an inorganic substance may be formed on the protective layer 12.

The substrate 11 is made of plastic or the like. More specifically, the substrate 11 can be made of polycarbonate, acrylic resin, norbornene resin, olefin resin, vinyl ester resin, or the like. The thickness of the substrate 11 is, for example, in a range of 0.03 mm to 0.3 mm.

The protective layer 12 is formed for the purpose of preventing the substrate 11 from being damaged when an information signal is recorded/reproduced using an optical pickup head or when the substrate 11 is handled. In order to prevent the substrate 11 from being damaged, it is preferable that the protective layer 12 is formed of a material with a hardness higher than that of the substrate 11 or a material with a coefficient of friction with respect to a pickup head smaller than that of the substrate 11. As a material for the protective layer 12, radiation-curable resin or an inorganic substance such as diamond-like carbon can be used. As the radiation-curable resin, for example, a hard coat material (e.g., Dyecure SD-715 produced by Dainippon Ink and Chemicals, Inc.) with a hardness higher than that of polycarbonate, or UV-curable resin (e.g., acrylic resin) having a pencil hardness of H or more can be used. In the case where the protective layer 12 is made of radiation-curable resin, the thickness of the protective layer 12 is, for example, in a range of 0.1 µm to 30 µm. Furthermore, the protective layer 12 may be formed of a thermosetting material. As the thermosetting material, siloxane resin or vinyl ester resin can be used.

In the case where the substrate 11 cannot be protected sufficiently only with the protective layer 12, an inorganic layer with a small coefficient of friction may be formed on the protective layer 12, as described below. For example, it may be possible that the protective layer 12 is formed of a hard coat material with a high hardness, and a diamond-like carbon layer with a small coefficient of friction is formed thereon.

Figure 2A:
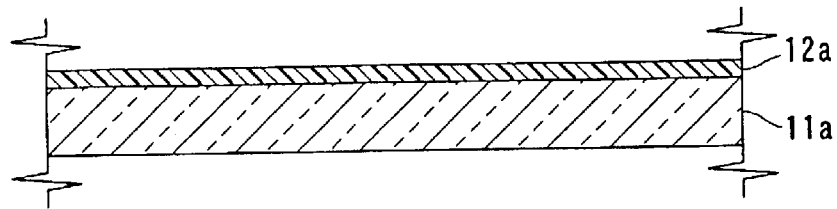
FIGS. 2A and 2B are cross-sectional views illustrating an example of processes of a method for producing a disk-shaped substrate according to the present invention.
Figure 2B:
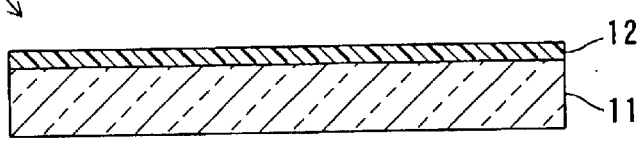

Hereinafter, FIGS. 2A and 2B show cross-sectional views illustrating processes of a producing method of Embodiment 1. According to the producing method of Embodiment 1, as shown in FIG. 2A, a protective layer 12a is formed on the surface of a transparent plate 11a (Process (a)). The transparent plate 11a is to be the substrate 11 by cutting, and is larger in area than the substrate 11. The protective layer 12a is to be the protective layer 12 by cutting, and is larger in area than the substrate 11. The plate 11a and the protective layer 12a respectively are made of the same materials as those of the substrate 11 and the protective layer 12. Furthermore, the plate 11a and the protective layer 12a respectively have the same thicknesses as those of the substrate 11 and the protective layer 12. In the case where the protective layer 12a is made of radiation-curable resin, the protective layer 12a can be formed by a method described later. Furthermore, in the case where the protective layer 12a is made of an inorganic substance, for example, the protective layer 12a can be formed by chemical vapor deposition (CVD), sputtering, or vapor deposition.

Next, in the plate 11a with the protective layer 12a formed thereon, a portion of the plate 11a other than that corresponding to an outer edge portion of the protective layer 12a is cut to form a disk shape (Process (b)). The portion other than that corresponding to an outer edge portion of the protective layer 12a refers to a portion away from an outer peripheral edge of the protective layer 12a by 1 mm or more (preferably 3 mm or more). The plate 11a can be cut by punching with a die or blowout using laser light or an electric arc. In the case of using a die, a method using a Thomson blade or a method in accordance with a shearing system can be used. In this process, as shown in FIG. 2B, the substrate 10 including the substrate 11 and the protective layer 12 formed on the surface of the substrate 11 can be produced. In the process (b), a through-hole may be formed at the center of the substrate 10.

Figure 3A:
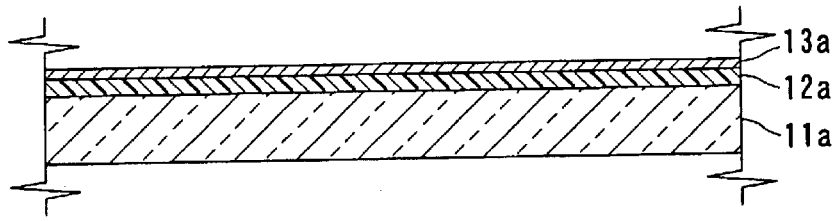
FIGS. 3A and 3B are cross-sectional views showing another example of processes of a method for producing a disk-shaped substrate according to the present invention.
Figure 3B:
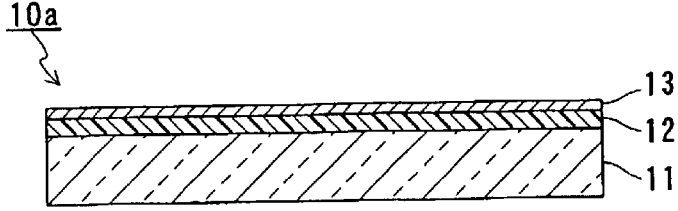

The process (a) may include the process of forming an inorganic layer 13a made of an inorganic substance on the surface of the protective layer 12a, as shown in FIG. 3A. The inorganic layer 13a can be made of diamond-like carbon or $SiO_2$, for example. The inorganic layer 13a can be formed by CVD or sputtering. In this case, as shown in FIG. 3B, a substrate 10a in which the inorganic layer 13 is formed on the protective layer 12 can be produced by cutting the plate 11a. The inorganic layer 13 may be formed after cutting the plate 11a.

Hereinafter, the producing method will be described specifically by way of two examples. A first specific example will be described with reference to FIGS. 4A to 4C.

FIRST EXAMPLE

Figure 4A:
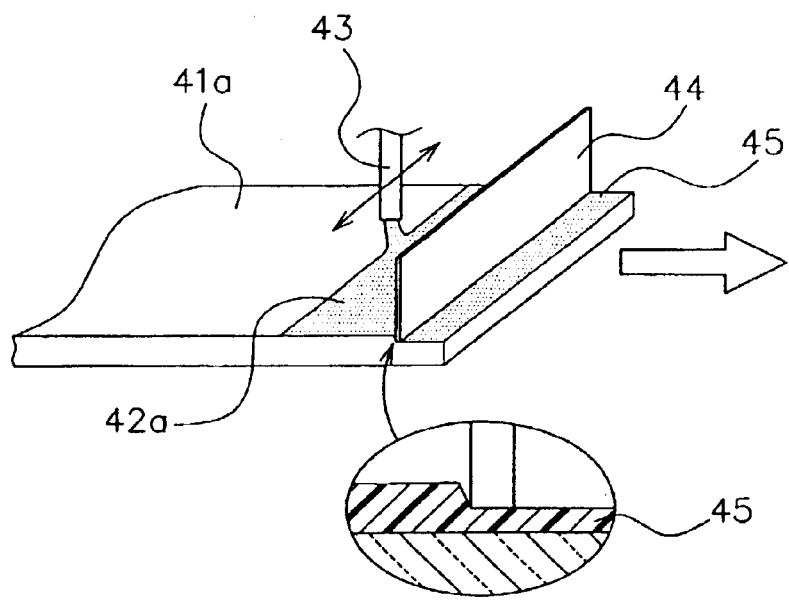
FIGS. 4A to 4C are still another example of processes of a method for producing a disk-shaped substrate according to the present invention.

In the first example, the protective layer 12 is formed of radiation-curable resin. First, as shown in FIG. 4A, radiation-curable resin 42a (represented by hatching) before being cured is dropped onto a transparent plate 41a (example of the plate 11a) through a nozzle 43. In this process, while the resin 42a is being dropped, the plate 41a is moved in a longitudinal direction, and the nozzle 43 is swung in a width direction of the plate 41a. The nozzle 43 is swung so that its swing becomes a half or more of the width of the plate 41a. Due to this swinging, the resin 42a can be disposed over the surface of the plate 41a. Polycarbonate with a thickness of 85 µm can be used as the plate 41a. Furthermore, the above-mentioned hard coat material can be used as the resin 42a.

The dropped resin 42a is spread to a substantially uniform thickness by a squeegee 44 placed in the vicinity of the nozzle 43, whereby a layer 45 is formed. The squeegee 44 is a spatula made of a flat plate having predetermined stiffness. The spacing between the squeegee 44 and the plate 41a is set in accordance with the thickness (e.g., 5 µm) of the protective layer to be formed. Thus, by moving the plate 41a, the layer 45 made of the resin 42a before being cured can be formed to a substantially uniform thickness.

Figure 5:
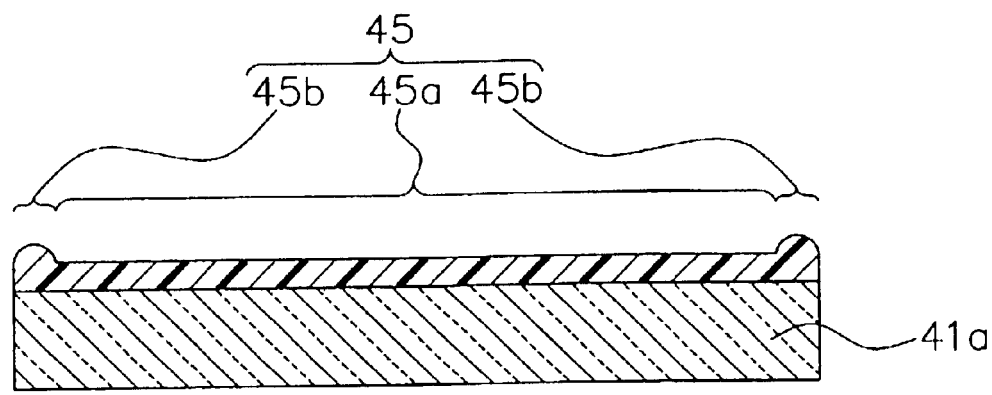
FIG. 5 is a cross-sectional view showing the state of one process of the producing method in FIG. 4.

FIG. 5 shows a cross-sectional view in a width direction of the plate 41a with the layer 45 formed thereon. The direction perpendicular to the drawing surface of FIG. 5 corresponds to a longitudinal direction of the plate 41a. As shown in FIG. 5, the layer 45 becomes thick at the end of the plate 41a due to surface tension. Therefore, the layer 45 includes a portion 45a with a substantially uniform thickness and a thick portion 45b.

Figure 4B:
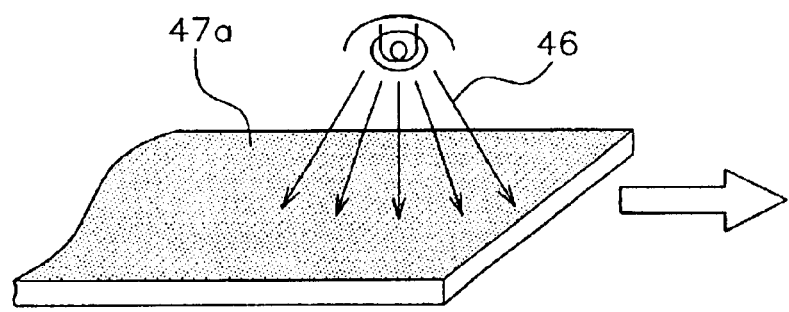

Next, as shown in FIG. 4B, the layer 45 is irradiated with radiation 46 such as an electron beam or UV-light to cure the radiation-curable resin, thereby forming a protective layer 47a. The radiation 46 may be radiated continuously or in a pulse manner (this also applies to the irradiation of radiation described below). In order to prevent the thickness of the protective layer 47a from being varied, it is preferable that the radiation 46 is radiated immediately after the layer 45 is formed with the squeegee 44. The protective layer 47a has the same shape as that of the layer 45 shown in FIG. 5.

Figure 4C:
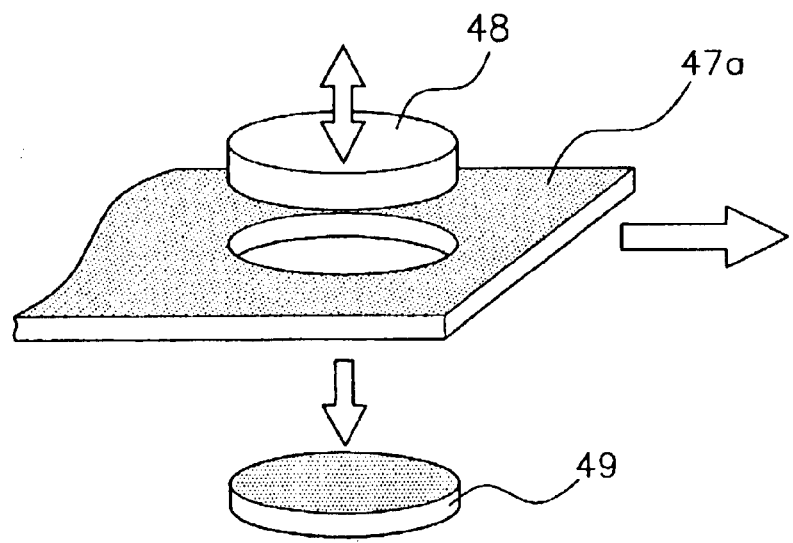

Next, as shown in FIG. 4C, the plate 41a with the protective layer 47a (example of the protective layer 12a) formed thereon is punched with a die 48, whereby a disk-shaped substrate 49 (example of the substrate 10; thickness: 90 μm, for example) is obtained. In the case where a central hole is formed in the substrate 49, the die 48 preferably has two blades corresponding to an inner periphery and an outer periphery of the substrate 49. For example, the substrate 49 is obtained by using a die having a Thomson blade in an annular shape corresponding to an inner periphery and an outer periphery of the substrate 49.

In the first example, the layer 45 may be formed by another method. For example, a method for spraying the resin 42a to the plate 41a and a method for soaking the plate 41a in the resin 42a can be used. In the case of spraying the resin 42a, a nozzle for spraying the resin 42a may be used as the nozzle 43. In the case where the layer 45 with a substantially uniform thickness can be formed by spraying the resin 42a, the squeegee 44 may be omitted.

Figure 6:
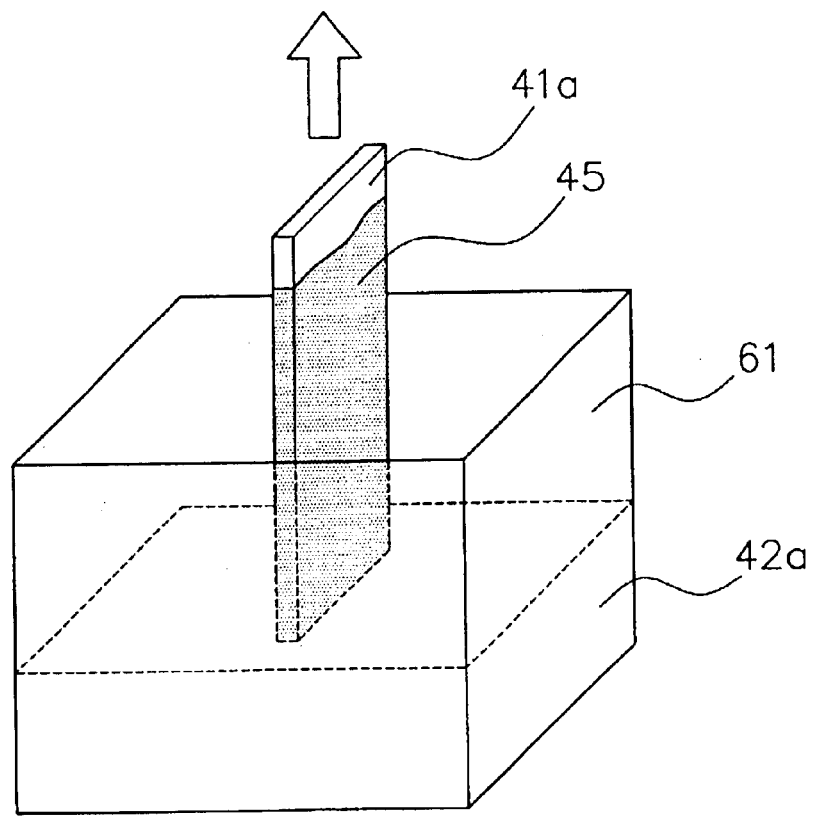
FIG. 6 is a cross-sectional view illustrating one process of a method for producing a disk-shaped substrate of the present invention.

FIG. 6 shows a method for forming the layer 45 by soaking. According to this method, the plate 41a is soaked in the resin 42a placed in a container 61. The plate 41a pulled up from the resin 42a is irradiated with radiation to cure the resin 42a, whereby a protective layer can be formed. At this time, one surface of the plate 41a is masked, whereby a protective layer can be formed only on the other surface of the plate 41a. It also may be possible that the thickness of the resin layer is made uniform with a squeegee in the same way as in FIG. 4A immediately after the plate 41a is pulled up from the resin 42a.

SECOND EXAMPLE

Figure 7A:
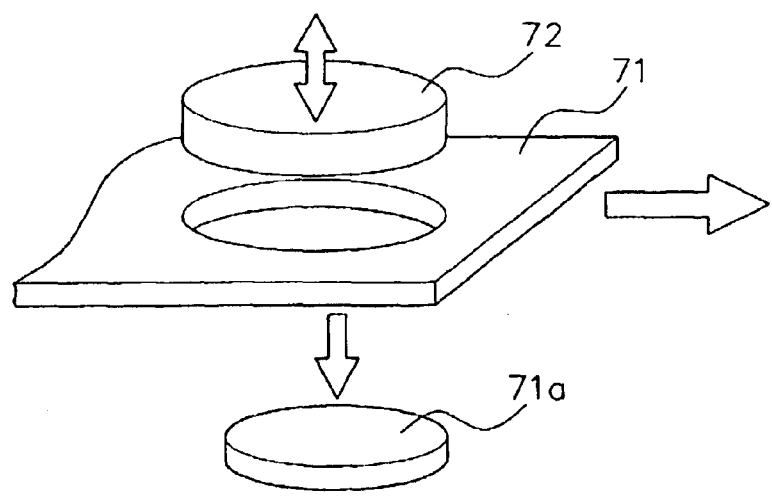
FIGS. 7A to 7D are cross-sectional views illustrating still another example of a method for producing a disk-shaped substrate of the present invention.

Next, a second specific example of the producing method of Embodiment 1 will be described with reference to FIGS. 7A to 7D. According to the second method, a disk-shaped plate is used as the plate 11a. First, as shown in FIG. 7A, a plate 71 is punched with a die 72 to form a disk-shaped transparent plate 71a. The plate 71a has a diameter larger than that of a substrate 75 to be formed finally. As the die 72, the same die as that described in the first method can be used. At this time, a central hole may be formed simultaneously. Furthermore, the plate 71a may be formed by casting or injection molding.

Figure 7B:
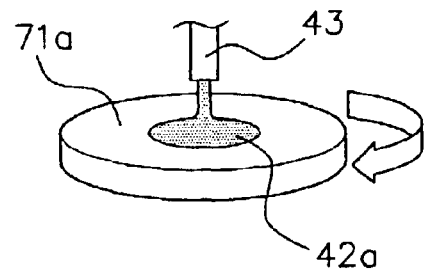

Next, as shown in FIG. 7B, while the disk-shaped plate 71a is rotated slowly, the radiation-curable resin 42a before being cured is dropped through the nozzle 43. The resin 42a is the same as that described in the first example.

Figure 7C:
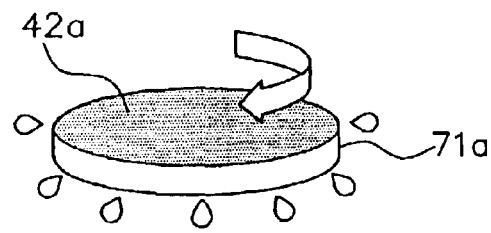

Next, as shown in FIG. 7C, by rotating the plate 71a at a high speed, a resin layer with a substantially uniform thickness is formed. Furthermore, by irradiating the resin layer with radiation, the resin layer is cured to form a protective layer (corresponding to the protective layer 12a). The protective layer thus formed has a larger thickness at an outer peripheral portion, and has a substantially uniform thickness at a portion other than the outer peripheral portion.

Figure 7D:
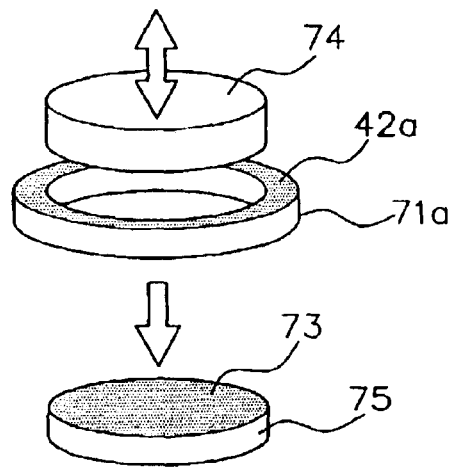

Finally, as shown in FIG. 7D, by punching the plate 71a with a die 74, the substrate 75 (corresponding to the substrate 10) with the protective layer 73 formed thereon can be obtained. The die 74 corresponds to the shape of the substrate 75. In this process, a central hole may be formed. According to the second method, the substrate 75 also is formed by punching out the portion where the thickness of the protective layer is substantially uniform, so that a substrate with a protective layer having a uniform thickness formed thereon can be obtained.

According to the producing method of Embodiment 1, care should be taken for the following two points. The first point is that a region where the protective layer 12a has a uniform thickness is identified, and an area for forming the protective layer 12a is determined so that the region becomes larger than that of the substrate 11. The second point is that a region where the protective layer 12a has a uniform thickness is cut out to form the substrate 10.

In Embodiment 1, the case where the protective layers 12 and 12a are made of radiation-curable resin has been described. However, these layers may be formed of thermosetting resin.

Furthermore, according to the producing method of Embodiment 1, as the plate 11a, it may be possible to use a substrate with a signal area formed on a surface opposite to a surface where the protective layer 12a is formed. In the signal area, unevenness corresponding to an information signal and grooves for tracking are formed. In this case, it is required to cut out the substrate 11 from the plate 11a so that the signal area is positioned appropriately in the substrate 11. Furthermore, in this case, a recording film or a reflective film may be formed on a surface of the plate 11a or the substrate 11 where the signal area is formed. Furthermore, the signal area may be formed before forming the substrate 11 (before punching out the substrate 11) or may be formed after forming the substrate 11. The signal area can be formed, for example, by a photopolymer method.

Furthermore, although the method for producing a circular disk-shaped substrate has been described in Embodiment 1, the producing method is not limited to a circular disk-shaped substrate and is applicable to production of a rectangular or polygonal card-shaped recording medium.

Embodiment 2

In Embodiment 2, an example of a producing method of the present invention for producing an optical disk will be described. This producing method is a method for producing an optical disk having a first substrate and a second substrate thinner than the first substrate. FIGS. 8A to 8D show cross-sectional views illustrating processes of the producing method of Embodiment 2.

Figure 8A:
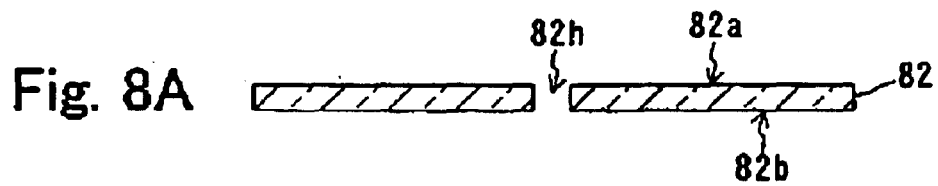
FIGS. 8A to 8D are cross-sectional views illustrating an example of processes of a method for producing an optical disk of the present invention.

First, as shown in FIG. 8A, a second substrate 82 is prepared. The second substrate 82 is made of plastic or the like. More specifically, the second substrate 82 can be formed of polycarbonate, acrylic resin, norbornene resin, olefin resin, vinyl ester resin, or the like. The thickness of the second substrate 82 is, for example, in a range of 0.03 mm to 0.3 mm, for example, 0.05 mm, 0.1 mm, or 0.2 mm. A central hole 82h is formed in the second substrate 82. The diameter of the central hole 82h preferably is larger than that of a clamp region described later. The central hole 82h may be formed after the first substrate and the second substrate are attached to each other. Furthermore, a signal area may be formed on one principal plane 82b opposed to one principal plane 82a.

Figure 8B:
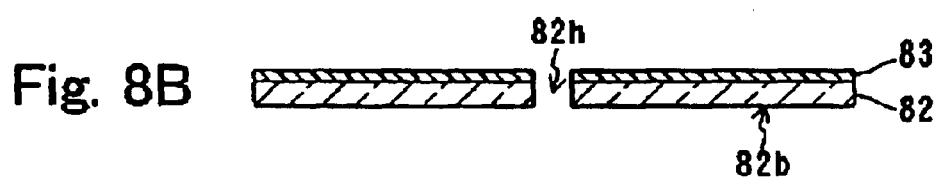

Next, as shown in FIG. 8B, a protective film 83 is formed on one principal plane 82a of the second substrate 82 (Process (A)). The protective film 83 is formed for the purpose of preventing the surface of the second substrate 82 from being damaged when the second substrate 82 is handled so as to produce an optical disk. It is preferable that the protective film 83 has a flexural rigidity lower than that of the second substrate 82 or has a hardness higher than that of the second substrate 82. The thickness of the protective film 83 is, for example, in a range of 0.03 mm to 1.2 mm. By prescribing the thickness of the protective film 83 to be 30 μm or more, the second substrate 82 can be protected sufficiently. By prescribing the total of the thickness of the second substrate 82 and the thickness of the protective film 83 in a range of 0.5 mm to 0.7 mm, a conventional producing apparatus used for producing an optical disk can be used.

In the case where the protective film 83 is removed in a later process, the protective film 83 is formed of a material that is likely to be removed from the second substrate 82, or the second substrate 82 and the protective film 83 are attached to each other with weak adhesion. For example, the protective film 83 may be formed of light-curable resin with weak adhesion to the second substrate 82. Furthermore, the second substrate 82 and the protective film 83 may be attached to each other with an adhesive or by static electricity. Furthermore, it also may be possible that the surface of the protective film 83 is made rough to some degree, and the second substrate 82 and the protective film 83 are attached to each other by applying pressure. In the case where the protective film 83 is not removed in a later process, the protective film 83 is formed of a material that is unlikely to peel off the second substrate 82.

Figure 8C:
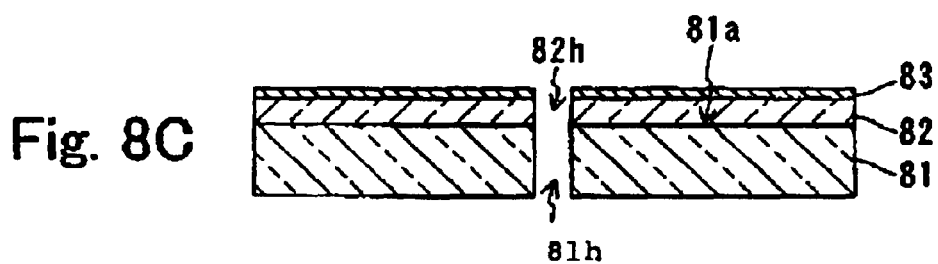

Next, as shown in FIG. 8C, the first substrate 81 and the second substrate 82 are attached to each other so that the protective film 83 is placed outside (Process (B)). More specifically, one principal plane 81*a* of the first substrate 81 is attached to one principal plane 82*b* of the second substrate 82. A signal area may be formed on one principal plane 81*a* of the first substrate 81. Furthermore, a signal recording layer is formed respectively on one principal plane 81*a* and one principal plane 82*b*, whereby an optical disk having two signal recording layers can be produced.

The first substrate 81 and the second substrate 82 can be attached to each other with radiation-curable resin. The first substrate 81 can be formed of the same material as that of the second substrate 82. The first substrate 81 is thicker than the second substrate 82. The total of the thickness of the first substrate 81 and the second substrate 82 preferably is in a range of 0.5 mm to 0.7 mm, or in a range of 1.1 mm to 1.3 mm. In this range, a conventional producing apparatus used for producing an optical disk can be used. Furthermore, by prescribing the total of the thicknesses of two substrates in a range of 1.1 mm to 1.3 mm, compatibility with respect to a conventional optical disk can be ensured. A central hole 81*h* may be formed in the first substrate 81. The central hole 81*h* may be formed after the first substrate 81 and the second substrate 82 are attached to each other.

Figure 8D:

Thus, an optical disk having the first substrate 81 and the second substrate 82 can be produced. The producing method of Embodiment 2 further may include a process (Process (C)) of removing the protective film 83 from the second substrate 82, as shown in FIG. 8D. The protective film 83 can be removed by the method described below.

Hereinafter, the producing method of Embodiment 2 will be described by way of 6 specific examples.

FIRST EXAMPLE

Figure 9A:
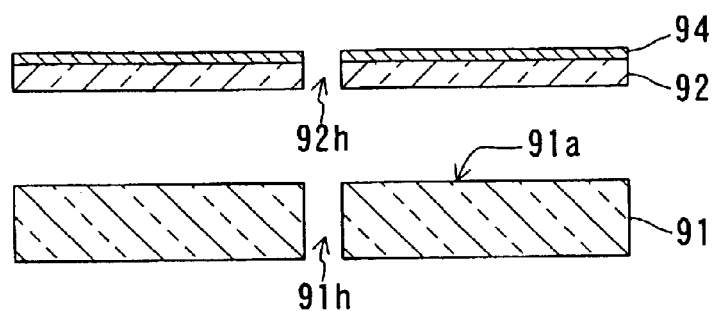
FIGS. 9A to 9C are cross-sectional views illustrating another example of a method for producing an optical disk of the present invention.
Figure 9B:
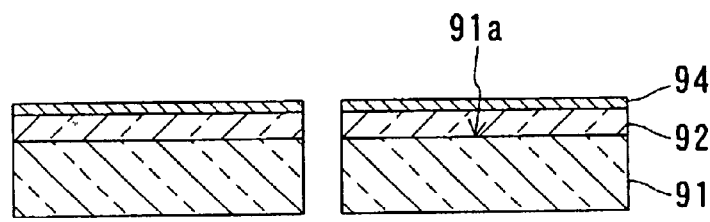
Figure 9C:
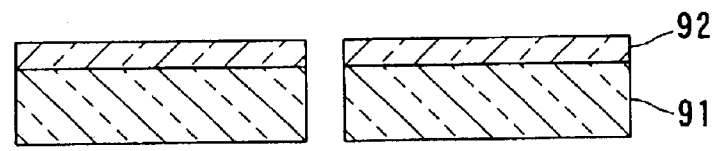

FIG. 9 shows a cross-sectional view illustrating processes of the first example. First, as shown in FIG. 9A, a disk-shaped first substrate 91 and a disk-shaped second substrate 92 are prepared. The first substrate 91 is made of polycarbonate formed by injection molding. The first substrate 91 has a thickness of 1.1 mm, a diameter of 120 mm, and a diameter of a central hole 91*a* of 15 mm. Pits corresponding to an information signal are formed on one principal plane 91*a* of the first substrate 91. Furthermore, a reflective film (not shown) made of aluminum with a thickness of 100 nm is formed on one principal plane 91*a*. The pits and the reflective film on one principal plane 91*a* form a signal area. The reflective film can be formed by sputtering.

The second substrate 92 is made of polycarbonate or acrylic resin. The second substrate 92 can be formed by a method for cutting a sheet formed by casting, or injection molding. The second substrate 92 has a thickness of 90 μm, a diameter of 120 mm and a diameter of a central hole 92*h* of 15 mm. A signal area is not formed on the second substrate 92. The surface of the second substrate 92 is flat. A protective film 94 made of polyester resin is formed on one principal plane of the second substrate 92. A central hole 94*h* is formed in the protective film 94. The protective film 94 has a thickness of 60 μm, a diameter of 120 mm and a diameter of a central hole 94*h* of 15 mm. The protective film 94 can be formed by a method for extruding a material through a slit, injection molding, or casting. The second substrate 92 and the protective film 94 can be attached to each other with light-curable resin having weak adhesion, an adhesive, or static electricity. Furthermore, it also may be possible that the surface of the protective film 94 is made rough to some degree, and the second substrate 92 and the protective film 94 are attached to each other by applying pressure.

Next, as shown in FIG. 9B, one principal plane 91*a* of the first substrate 91 and the second substrate 92 are attached to each other so that the protective film 94 is placed outside. An attachment method will be described with reference to FIG. 10.

Figure 10A:
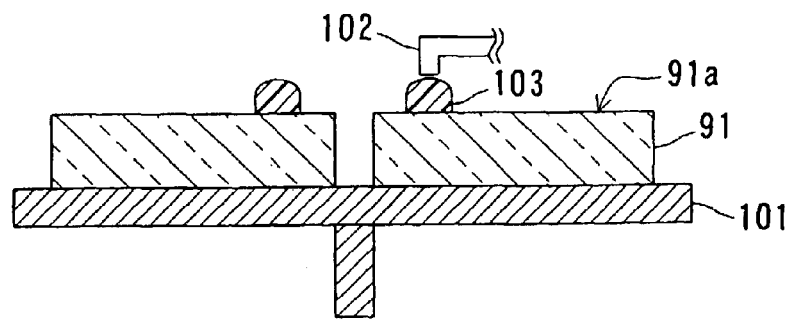
FIGS. 10A to 10E are cross-sectional views illustrating still another example of a method for producing an optical disk of the present invention.

First, as shown in FIG. 10A, the first substrate 91 is placed on a table 101, and light-curable resin 103 is dropped onto one principal plane 91*a* of the first substrate 91 through a nozzle 102. The resin 103 is placed in an annular shape with a diameter of about 54 mm. At this time, the first substrate 91 or the nozzle 102 is rotated at a low speed of 20 rpm to 120 rpm. The resin 103 may be applied to the second substrate 92.

Figure 10B:
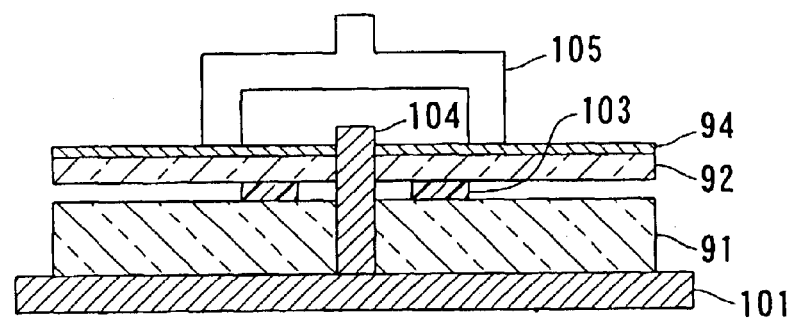

Next, as shown in FIG. 10B, the second substrate 92 is stacked on the first substrate 91 so that the first substrate 91 and the second substrate 92 are placed concentrically, and the protective film 94 is placed outside. More specifically, the first substrate 91 is fixed to the table 101 with a pin 104. Then, the second substrate 92 is moved by being held by an arm 105, and the central hole of the second substrate 92 is fitted on the pin 104. According to the producing method of Embodiment 2, since the protective film 94 is held by the arm 105, even if the second substrate 92 is thin, the second substrate 92 can be prevented from being damaged.

Figure 10C:
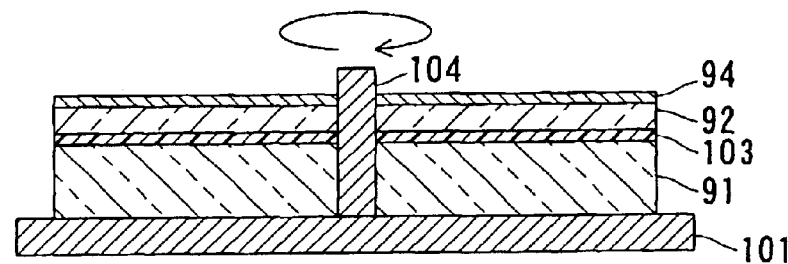

Next, as shown in FIG. 10C, the first substrate 91 and the second substrate 92 are rotated at a high speed (e.g., 1000 rpm to 10000 rpm) by rotating the table 101, whereby the resin 103 is spread to an outer peripheral edge of the substrate. According to this method, air bubbles can be prevented from being mixed between the first substrate 91 and the second substrate 92, and excessive resin 103 can be discharged.

Figure 10D:
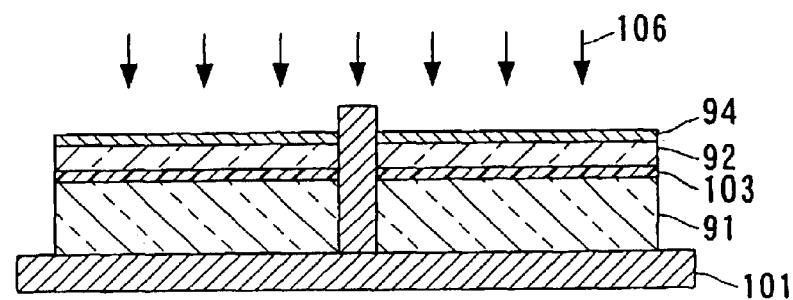

Next, as shown in FIG. 10D, light 106 such as UV-light is radiated to cure the resin 103. At this time, the light 106 may be radiated from an upper side, from a lower side, or from both the upper and lower sides. In the case where the light 106 is radiated from the lower side, a radiation-transmitting table such as glass is used. The light 106 may be radiated in a pulse manner or continuously. By varying these radiation conditions, the tilt (inclination) of an optical disk can be controlled.

Figure 10E:
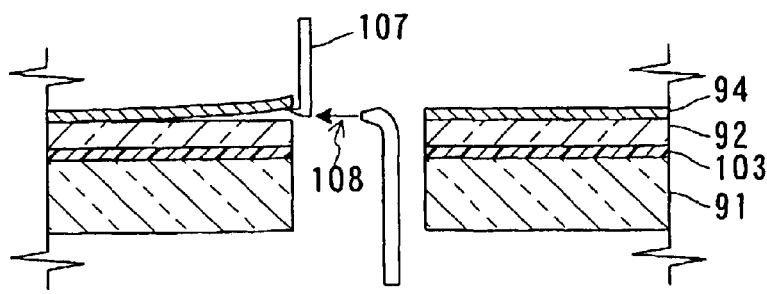

Next, the protective film 94 is peeled off the second substrate 92. FIG. 10E shows an enlarged view in the vicinity of the central hole during this process. Specifically, a part of an inner peripheral edge of the protective film 94 is floated with a hook 107, and an air stream 108 is blown to the floated inner peripheral edge, whereby the protective film 94 is peeled off. Thereafter, the protective film 94 is removed with an adsorption arm. In the process shown in FIG. 10C, the resin 103 may be transferred to the protective film 94 side of the second substrate 92. However, the protective film 94 can prevent the resin 103 from adhering to the surface of the second substrate 92. The peeled protective film 94 can be reused as it is, or reused after melting.

Thus, an optical disk can be produced. In the first example, the case where the first substrate 91 is fixed to the table 101 has been described. However, the second substrate 92 may be fixed to the table 101. Even in this case, the side of the second substrate 92 on which the protective film 94 is formed is fixed to the table 101, so that the surface of the second substrate 92 can be prevented from being damaged when the table 101 is rotated.

Furthermore, in the first example, a signal area is formed only on the first substrate 91. However, a semi-transparent signal area may be formed even on the second substrate 92. In this case, if a signal area is formed directly on the second substrate 92, it is not easy to form the signal area on the thin second substrate 92 by sputtering. However, by forming a protective film with a high stiffness on the second substrate 92, it becomes easy to form a signal area on the second substrate 92.

Furthermore, in the first example, the case where a read-only optical disk is produced has been described. However, according to the producing method of Embodiment 2, an optical disk in which an information signal can be written also can be produced.

SECOND EXAMPLE

In the second example, the case will be described in which the diameter of the central hole 92h of the second substrate 92 and that of the central hole 94h of the protective film 94 are varied in the first example. The description of the same components as those in the first example will be omitted here.

Figure 11A:
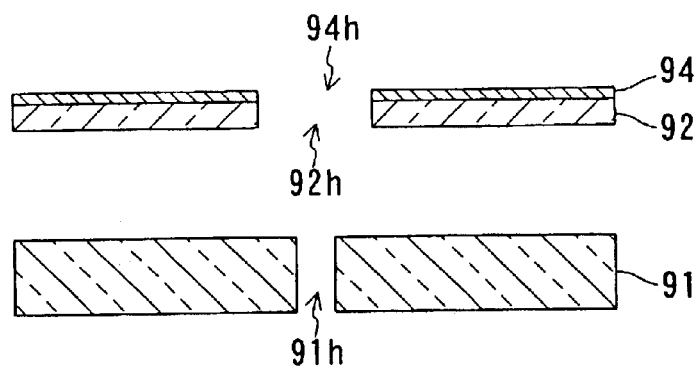
FIGS. 11A to 11B are cross-sectional views illustrating still another example of a method for producing an optical disk of the present invention.

In the second example, as shown in FIG. 11A, the central holes 92h and 94h are made larger than the central hole 91h of the first substrate 91. More specifically, the diameters of the central holes 92h and 94h are set to be 40 mm. In this configuration, the second substrate 92 is not placed at an inner peripheral edge of the first substrate 91. Therefore, a center cone for fixing an optical disk can be prevented from coming into contact with the second substrate 92 during use of the optical disk, and the second substrate 92 can be prevented from being damaged or peeled off. In particular, by setting the inner peripheral edge of the second substrate 92 to be larger than a clamp region, only the first substrate 91 is fixed during use of the optical disk, and tilt of the optical disk can be prevented. Herein, a "clamp region" refers to a region that is held for rotating an optical disk during use of the optical disk.

Figure 11B:
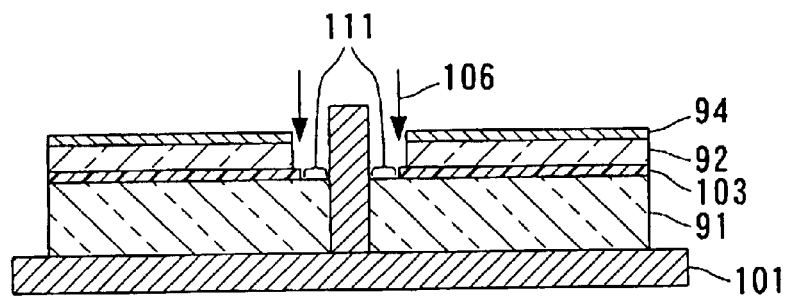

Furthermore, in the second example, after the second substrate 92 is stacked on the first substrate 91, the light 106 is radiated to an outer peripheral side of the clamp region 111, as shown in FIG. 11B, whereby the resin 103 can be prevented from entering the clamp region 111. According to this method, the thickness of the clamp region 111 can be made uniform; as a result, tilt of the optical disk can be reduced further.

THIRD EXAMPLE

In the third example, the case will be described in which only the diameter of the central hole 94h of the protective film 94 is different from that in the second example. The description of the same components as those in the second example will be omitted here.

In the third example, the diameter of the central hole 92h is set to be 40 mm, and that of the central hole 94h is set to be 15 mm. According to this configuration, the same effect as that of the second example can be obtained. Furthermore, according to this configuration, the protective film 94 can prevent the resin 103 from adhering to the first substrate 91 and the table 101.

FOURTH EXAMPLE

In the fourth example, the case will be described in which only the thicknesses of the second substrate 92 and the protective film 94 are different from those in the first example. The description of the same components as those in the first example will be omitted here.

In the fourth example, the thickness of the second substrate 92 is set to be 90 μm, and the thickness of the protective film 94 is set to be 0.5 mm. In this configuration, the total of the thickness of the second substrate 92 and the thickness of the protective film 94 becomes about 0.6 mm. In the present production of a DVD, two substrates with a thickness of 0.6 mm generally are attached to each other. Therefore, according to the configuration of the fourth example, a conventional producing apparatus can be used. As described in the second and third examples, the sizes of the central holes 92h and 94h may be varied.

FIFTH EXAMPLE

In the fifth example, the case where the flexural rigidity of the protective film 94 is varied will be described. The other portions are the same as those in the first example, so that the repeated description thereof will be omitted here.

The flexural rigidity of the protective film 94 was varied by changing the material for the protective film 94. More specifically, optical disks were produced using a protective film with a flexural rigidity lower than that of the second substrate 92, a protective film with the same flexural rigidity as that of the second substrate 92, and a protective film with a flexural rigidity higher than that of the second substrate 92. In the fifth example, the thickness of the resin 103 was set to be about 20 μm. The optical disks thus obtained were measured for a variation in thickness of the resin 103.

As a result, it was found that in the case where the flexural rigidity of the protective film 94 is lower than that of the second substrate 92, a variation in thickness of the resin 103 is small. The reason for this is considered as follows: when the resin 103 is spread by rotating the table 101, the resin 103 is likely to spread uniformly when the flexural rigidity of the protective film 94 is lower.

On the other hand, when the flexural rigidity of the protective film 94 is higher than that of the second substrate 92, it becomes easy to handle the second substrate 92. Furthermore, even in the case where a reflective layer and a signal recording layer are formed on the second substrate 92, they can be formed easily.

The protective film with a low flexural rigidity and the protective film with a high flexural rigidity may be formed on the second substrate 92. In this case, it is preferable that the protective film with a high flexural rigidity is peeled off before the first substrate 91 and the second substrate 92 are attached to each other, and the protective film with a low flexural rigidity is peeled off after the attachment.

SIXTH EXAMPLE

In the sixth example, the case where the second substrate 92 is fixed to the table 101 will be described. The description of the same components as those in the first example will be omitted here.

Figure 12A:
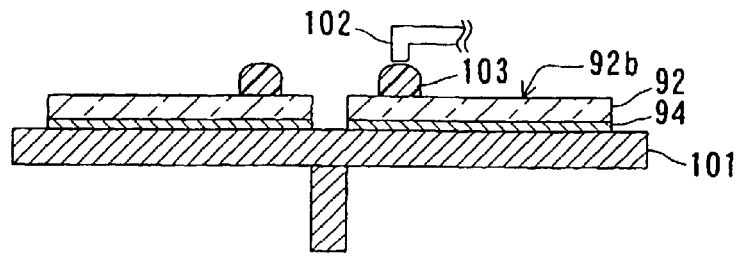
FIGS. 12A to 12C are cross-sectional views illustrating still another example of a method for producing an optical disk of the present invention.

First, as shown in FIG. 12A, the second substrate 92 with the protective film 94 formed on one principal plane is placed on the table 101 so that the protective film 94 is placed on the table 101 side. Then, the light-curable resin 103 is dropped onto the second substrate 92 through the nozzle 102 so as to be placed in an annual shape. At this time, the table 101 or the nozzle 102 is rotated at a low speed (20 rpm to 120 rpm). The resin 103 may be applied to the first substrate 91.

Figure 12B:
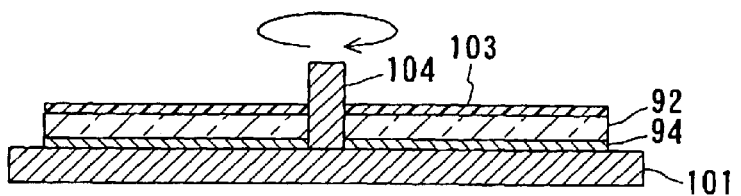

Next, as shown in FIG. 12B, the second substrate 92 is fixed with the pin 104, and the second substrate 92 is rotated at a high speed (1000 rpm to 12000 rpm) by rotating the table 101. Thus, the excessive resin 103 is shaken off, whereby a layer of the resin 103 with uniform thickness can be formed on the second substrate 92.

Figure 12C:
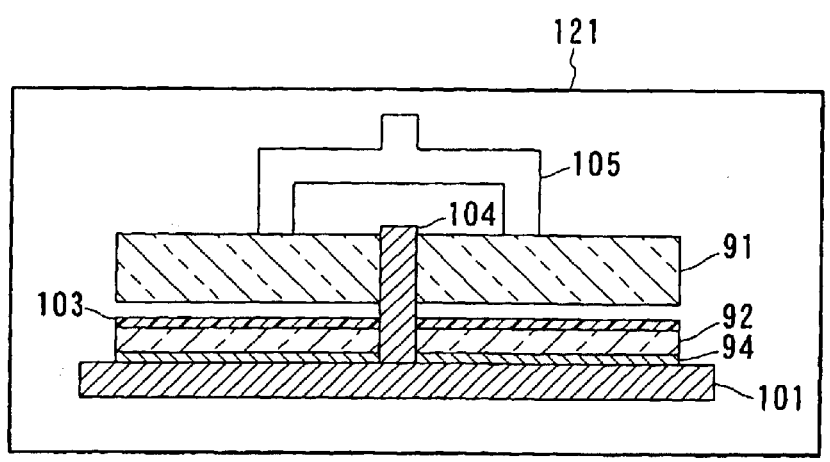

Next, as shown in FIG. 12C, the first substrate 91 is moved by being held by the arm 105, and the central hole of the first substrate 91 is fitted on the pin 104. In order to prevent air bubbles from being mixed between the first substrate 91 and the second substrate 92, this process is conducted in a container 121 under a reduced pressure. It is preferable that the container 121 is evacuated to 1000 Pa or less.

The subsequent processes are the same as those in FIGS. 10D and 10E, so that the description thereof will be omitted here. Thus, optical disks can be produced.

According to the producing method of Embodiment 2, the substrate 10 formed by the producing method of Embodiment 1 may be used as the second substrate 92. More specifically, the producing method of Embodiment 2 may include the processes (a) and (b) described in Embodiment 1 prior to the process (A). In this case, an optical disk is produced using the substrate 11 with the protective layer 12 and the protective film 94 formed thereon.

Embodiment 3

In Embodiment 3, an example of a producing apparatus of the present invention used for producing an optical disk will be described. The producing apparatus of Embodiment 3 produces an optical disk using a first substrate and a second substrate, and is used for conducting the producing method of Embodiment 2 or 3.

The producing apparatus of Embodiment 3 includes a first substrate 91, a second substrate 92 with a protective film 94 formed on one principal plane, attachment means for attaching the first substrate 91 and the second substrate 92 to each other so that the protective film 94 is placed outside, and peeling means for peeling the protective film 94. The producing apparatus further may include protective film-forming means for forming a protective film on one principal plane of the second substrate.

As the attachment means, the means described in Embodiment 2 can be used. The attachment means may include coating means, stacking means, and irradiation means. Furthermore, the attachment means further may include rotation means for rotating the stacked first substrate 91 and second substrate 92.

The coating means is used for coating at least one substrate selected from the group consisting of the first substrate 91 and the second substrate 92 with radiation-curable resin. More specifically, the coating means includes a rotatable table 101, a nozzle 102, a squeegee and the like.

The stacking means is used for stacking the first substrate 91 and the second substrate 92 on top of the other so that the center of the first substrate 91 is matched with that of the second substrate 92. More specifically, the stacking means includes a pin 104, an arm 105 for transporting a substrate and the like.

The irradiation means is used for irradiating radiation. More specifically, a rare gas lamp such as a xenon lamp, an electron beam source, a metal halide lamp, a mercury lamp, or the like can be used.

As the rotation means, a rotatable table can be used.

Furthermore, the coating means may include dropping means for dropping radiation-curable resin, rotation means for rotating a substrate onto which radiation-curable resin is dropped and a container 121 that can be evacuated. As the dropping means, a nozzle 102 or the like can be used. Furthermore, as the rotation means, a rotatable table 101 or the like can be used. The container 121 that can be evacuated preferably can be evacuated to 1000 Pa or less.

Embodiment 4

In Embodiment 4, another example of a producing method for producing an optical disk will be described. The producing method of Embodiment 4 is a method for producing an optical disk including a second substrate with a signal area formed on one principal plane and a first substrate attached to the second substrate. FIGS. 13A to 13D schematically show cross-sectional views illustrating the processes of a method for producing an optical disk of Embodiment 4.

According to the producing method of Embodiment 4, first, as shown in FIG. 13A, a second substrate 131 with a signal area SA formed on one principal plane 131a is prepared, and the other principal plane 131b opposite to one principal plane 131a is fixed to a support 132 (Process (i)). The signal area SA may be formed in a later process. More specifically, the producing method of Embodiment 4 may include the process of forming the signal area SA between the process (i) and the process (ii). In this case, the signal area SA can be formed by a photopolymer method using a stamper or the like. Furthermore, as the second substrate 131, for example, the substrate 10 (see FIG. 2B) or the substrate 10a (see FIG. 3B) may be used.

The second substrate 131 preferably has a thickness in a range of 0.03 mm to 0.3 mm, for example, 0.05 mm, 0.1 mm, or 0.2 mm. The second substrate 131 is made of transparent resin such as polycarbonate, acrylic resin, olefin resin, norbornene resin, vinyl ester resin, or the like. Uneven pits are formed on one principal plane 131a of the second substrate 131, which function as the signal area SA. More specifically, one principal plane 131a is a plane onto which an information signal is recorded. The second substrate 131 is formed by molding resin by injection molding, casting, extrusion molding, a photopolymer method (2P method), a thermosetting method for curing thermosetting resin with heat, or the like. It is preferable that the second substrate 131 is fixed to the support 132 immediately after being molded.

Figure 14A:
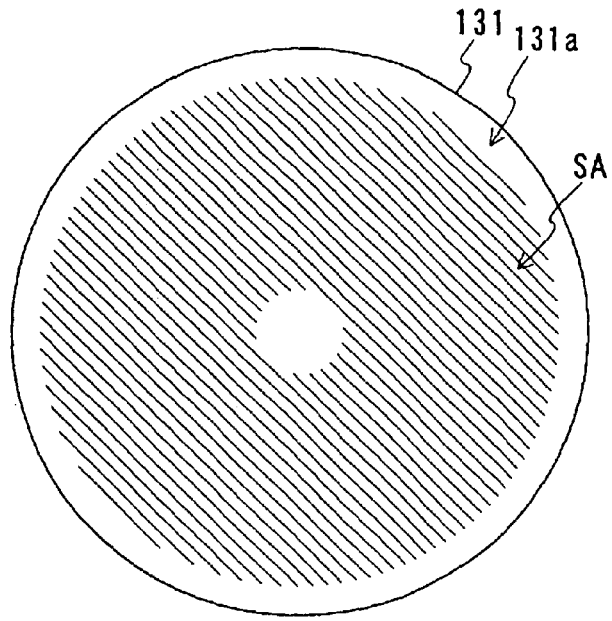
FIGS. 14A and 14B are plan views showing an example of a substrate used for a method for producing an optical disk of the present invention.
Figure 14B:
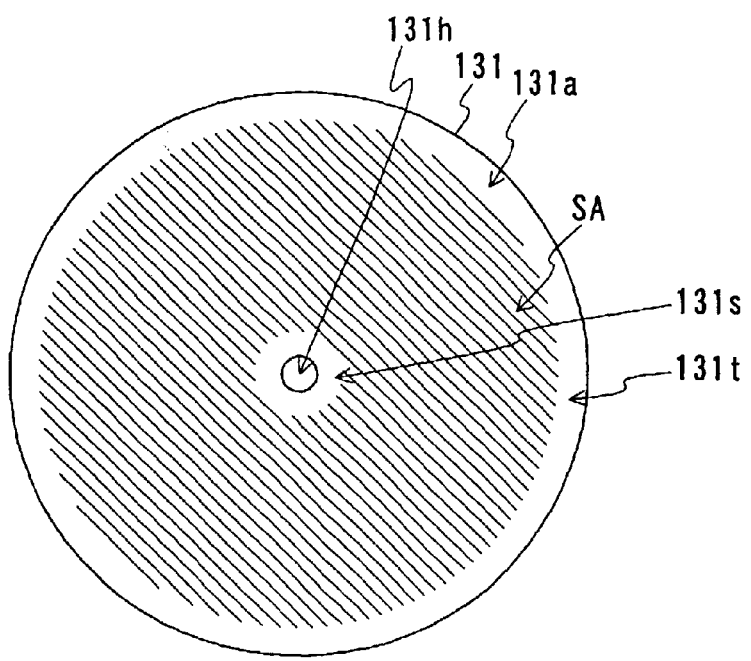

FIG. 14A shows a plan view of the second substrate 131. A shaded area in FIG. 14A is the signal area SA. FIG. 13 shows the case where a through-hole is formed at the center of the second substrate 131 and the first substrate 150 after these substrates are attached to each other. However, substrates having a through-hole may be used as the second substrate and the first substrate. FIG. 14B shows a plan view of the second substrate 131 in this case. As shown in FIG. 14B, the second substrate 131 is provided with a through-hole 131$h$ at the center thereof.

The support 132 is provided with a fixing mechanism (fixing means) 133 for fixing the other principal plane 131$b$. FIG. 13 shows the case where the fixing mechanism 133 is placed on one principal plane of the support 132. This is shown merely for illustrative purpose, and there is no particular limit to the configuration of the fixing mechanism 133, as described in the following embodiment. Furthermore, the fixing mechanism also may function as a support. As the method for fixing the other principal plane 131$b$ to the support 132, at least one method selected from the group consisting of a method using static electricity, a vacuum adsorption method, a method using a pressure member, and a method using an adhesive member made of an adhesive material can be used. The support 132 and the fixing mechanism 133 are flush with the surface in contact with the second substrate 131, whereby a warp and a wave on the second substrate 131 can be prevented from occurring.

Thereafter, as shown in FIG. 13B, while the second substrate 131 is fixed to the support 132, a recording/reflective film 140 including at least one selected from a metal film, a dielectric film, a magnetic film and a coloring film is formed on one principal plane 131$a$ (Process (ii)). The recording/reflective film 140 can be formed by sputtering, vapor deposition or spin coating, depending upon the film to be formed. At this time, the second substrate 131 is fixed to the support 132 by the above-mentioned fixing method. Therefore, a warp and a wave on the second substrate 131 can be prevented from occurring due to the heat generated when the recording/reflective film 140 is formed and the stress generated by the recording/reflective film 140.

Thereafter, as shown in FIG. 13C, the second substrate 131 and the first substrate 150 are attached to each other with the recording/reflective film 140 interposed therebetween (Process (iii)). The thickness of the first substrate 150 is larger than that of the second substrate 131, and is, for example, in a range of 0.5 mm to 1.5 mm (e.g., 1.1 mm). The total of the thickness of the second substrate 131 and that of the first substrate 150 preferably is in a range of 0.5 mm to 0.7 mm, or in a range of 1.1 mm to 1.3 mm.

The first substrate 150 may have a signal area (signal surface) on the side that is to be attached to the second substrate 131. Examples of the method for attaching the second substrate 131 and the first substrate 150 to each other include a method (see FIG. 13C) using radiation-curable resin 151, a hot-melt method and a method using an adhesive sheet. In the case of using the radiation-curable resin, specifically, the radiation-curable resin 151 is applied between the second substrate 131 and the first substrate 150, and the second substrate 131 and the first substrate 150 are stacked on top of the other. Thereafter, two stacked substrates are spun to spread the radiation-curable resin 151, and then, the radiation 152 is radiated, whereby the radiation-curable resin 151 may be cured. As the radiation-curable resin, for example, UV-curable resin, resin that is cured by irradiation with an electron beam or the like can be used. In FIG. 13C, radiation is radiated from the first substrate 150 side. However, radiation may be radiated from the support 132 side, using a substrate and a support made of a radiation-transmitting material for the second substrate 131 and the support 132. Because of this, even in the case where the recording/reflective film having no radiation permeability is formed on the first substrate 150, the radiation-curable resin placed between the second substrate 131 and the first substrate 150 can be cured easily.

Thereafter, as shown in FIG. 13D, the other principal plane 131$b$ of the second substrate 131 is released from the support 132 (Process (iv)). Thus, an optical disk 130 is obtained in which the second substrate 131 and the first substrate 150 are attached to each other with the recording/reflective film 140 interposed therebetween.

In the case where the second substrate 131 has a circular through-hole 131$h$ at the center (see FIG. 14B), the other principal plane 131$b$ can be fixed to the support 132 by pressing at least one selected from an inner peripheral edge 131$s$ and an outer peripheral edge 131$t$ of the second substrate 131 to the support 132, using a pressure member. In this case, it is preferable that the other principal plane 131$b$ is fixed to the support 132 by a method different from the above-mentioned pressure member prior to the process (iii) after the process (ii), whereby pressing with the pressure member is finished. As the above-mentioned different method, at least one selected from a method using vacuum adsorption and a method using static electricity can be used. The method for fixing the other principal plane 131$b$ to the support 132 will be described specifically in the following embodiment.

According to the producing method of Embodiment 4, after the second substrate 131 is fixed to the support 132, the recording/reflective film 140 is formed. Therefore, according to the producing method of Embodiment 4, even in the case where the second substrate 131 is thin, a warp and a wave can be prevented from occurring on the second substrate 131, and the second substrate 131 becomes likely to be handled. Therefore, according to the method for producing an optical disk of Embodiment 4, an optical disk with less warp and wave can be produced easily.

Embodiment 5

Figure 15:
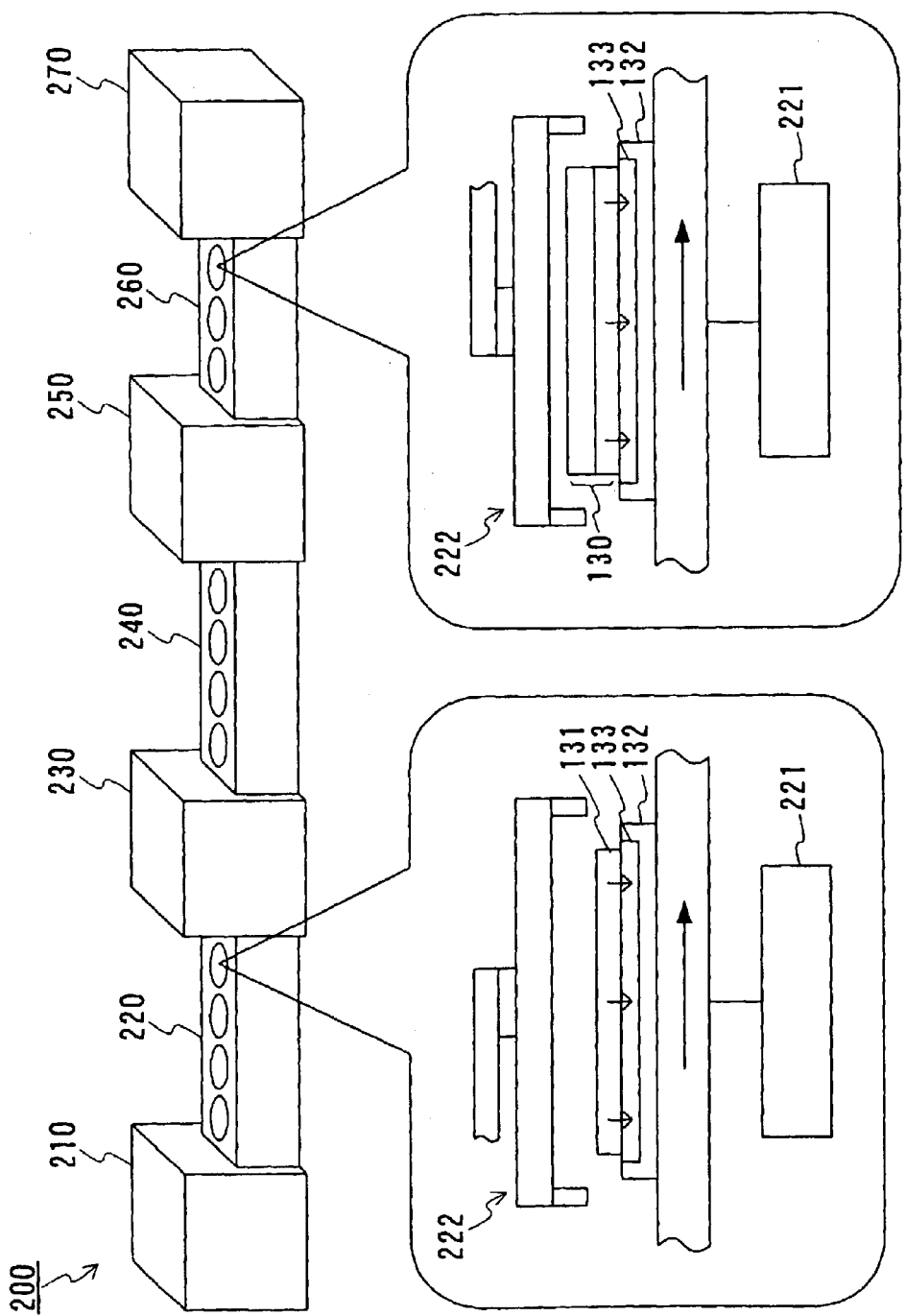
FIG. 15 is a schematic view showing an example of an apparatus for producing an optical disk of the present invention.

In Embodiment 5, an example of an apparatus for producing an optical disk of the present invention will be described, which can be used for the method for producing an optical disk of the present invention described in Embodiment 4. The same components as those in Embodiment 4 are denoted with the same reference numerals as those therein, and repeated description thereof will be omitted here. FIG. 15 schematically shows the configuration of an optical disk producing apparatus 200 of Embodiment 5. In the following figures, hatching may be omitted for ease of understanding.

The optical disk producing apparatus 200 includes a substrate supply device 210, substrate transporting devices 220, 240 and 260, a film-forming device 230, a substrate attaching device 250 and an optical disk recovery device 270. The optical disk producing apparatus 200 also includes supports 132 transported from the substrate supply device 210 to the optical disk recovery device 270.

The substrate supply device 210 successively transfers the second substrate 131 to a plurality of supports 132 in the substrate transporting device 220. The substrate supply device 210 is supplied with the second substrate 131 from a substrate producing device (not shown) such as an injection molder or a 2P producing device.

The substrate transporting device 220 is placed so as to move the support 132, to which the second substrate 131 is fixed, from the substrate supply device 210 to the film-forming device 230. Similarly, the substrate transporting device 240 is placed so as to move the support 132, to which the second substrate 131 is fixed, from the film-forming device 230 to the substrate attaching device 250, and the substrate transporting device 260 is placed so as to move the support 132, to which the second substrate 131 is fixed, from the substrate attaching device 250 to the optical disk recovery device 270.

As shown in FIG. 15, the substrate transporting devices 220 and 260 have a plurality of supports 132 for fixing the second substrates 131, driving mechanisms 221 for transporting the supports 132, and support moving devices 222. The optical disk producing apparatus 200 includes fixing mechanisms (fixing means) 133 for fixing the other principal plane 131b on the opposite side of the signal area of the second substrate 131 to the support 132. The support moving device 222 has a function of receiving the support 132, to which the second substrate 131 is fixed, from the device in the previous process of the substrate transporting devices 220, 240 and 260, and transferring them to the device in the subsequent process. Although not shown, the substrate transporting device 240 also has the same function.

The film-forming device 230 functions as means for forming the recording/reflective film 140. That is, the optical disk producing apparatus 200 includes film-forming means for forming a film including at least one selected from a metal film, a dielectric film, a magnetic film and a coloring film. More specifically, as the film-forming device 230, a device including at least one selected from a sputtering device, a vacuum film-forming device such as a vapor deposition device and a spin coater can be used.

In the case of attaching the second substrate 131 and the first substrate 150 to each other, using radiation-curable resin, the substrate attaching device 250 functions as means for attaching substrates, and includes, for example, a coating device for applying radiation-curable resin between the second substrate 131 and the first substrate 150 fixed on the support 132 and means for irradiating radiation that cures radiation-curable resin. As the coating device, a spinner provided with a resin dropping nozzle, a screen printing device and the like can be used. As the irradiation means, a mercury lamp, a metal halide lamp, a rare gas lamp or the like can be used.

In the substrate transporting device 260, by releasing the other principal plane 131b of the second substrate 131 from the fixing mechanism 133, the optical disk 130, in which the second substrate 131 and the first substrate 150 are integrated, is released and transferred to the disk recovery device 270. In the disk recovery device 270, the optical disks 130 are stacked on a stock pole for recovery (not shown).

As the method for fixing the other principal plane 131b of the second substrate 131 to the support 132, various methods can be used. More specifically, at least one method selected from a method using static electricity, a method using vacuum adsorption, a method using a pressure member and a method using an adhesive member made of an adhesive material can be used. In this case, the optical disk producing apparatus 200 includes a static electricity generating device, a vacuum adsorption device, a pressure member, an adhesive member formed on a support and the like, in accordance with the respective methods.

The case where the second substrate 131 is fixed to the support 132 using static electricity will be described with reference to FIGS. 16A and 16B.

Figure 16A:
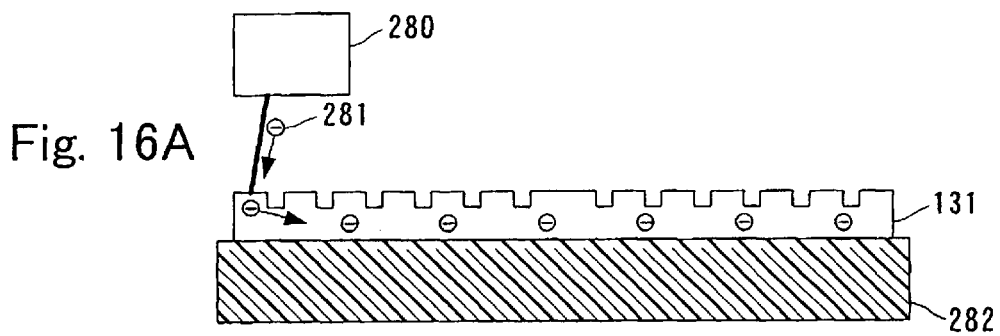
FIGS. 16A and 16B are schematic cross-sectional views showing an example of fixing means for a second substrate in the apparatus for producing an optical disk of the present invention.
Figure 16B:
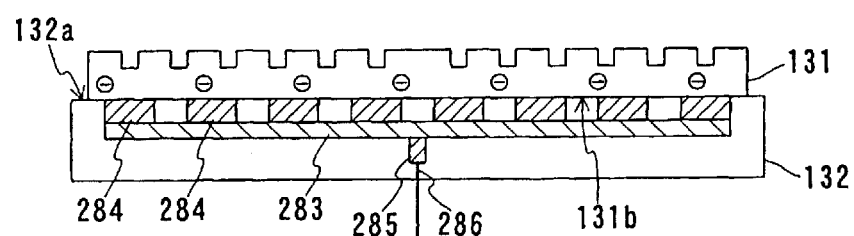
Figure 16B:
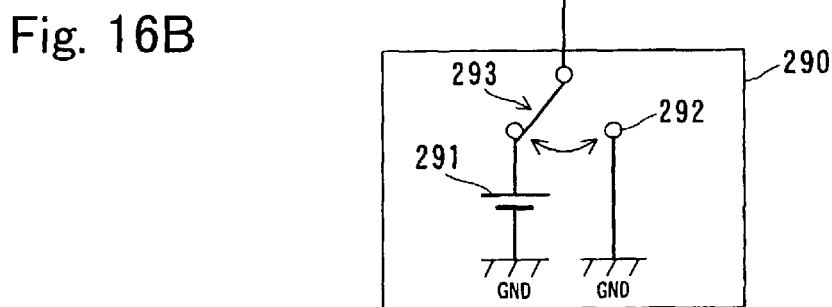

FIG. 16A shows a method in the case of fixing the second substrate 131 and the support 132 to each other by supplying a charge to the second substrate 131. In this case, an insulator is used for the support 132. According to this method, first, the second substrate 131 is placed on a base 282 made of an insulator. Then, a negative charge supply device 280 is connected to a part of the second substrate 131, and negative charge 281 is supplied to the inside of the second substrate 131 by the negative charge supply device 280. Since the base 282 is an insulator, the negative charge 281 is accumulated in the second substrate 131 without moving to the base 282. After the elapse of a predetermined period of time, the negative charge supply device 280 is disconnected from the second substrate 131, and the second substrate 131 is placed on the insulating support 132 shown in FIG. 16B.

The material for the support 132 is an insulator such as ceramic. In the support 132, an electrode 283 and charged bodies such as lithium niobate placed on the electrode 283 are buried. A part of the charged bodies 284 is exposed to a surface 132a side of the support 132 that is in contact with the second substrate 131. The electrode 283 is connected to a power source 290 for applying a voltage via a connection pin 286 at a connecting portion 285.

The power source 290 for applying a voltage includes a power source 291 for supplying a charge, a ground terminal 292 and a switch 293 so that charge is supplied to the electrode 283. In the first support 132 on the substrate transporting device 220 shown in FIG. 15, the connection pin 286 is inserted into the support 132 and connected to the connecting portion 285.

Next, the switch 293 is switched to the power source 291 for supplying a charge, and positive charge is supplied from the power source 291 for supplying a charge to the electrode 283. At this time, negative charge is generated on the surface of the charged body 284 that is in contact with the electrode 283 due to polarization, and simultaneously, positive charge is generated on the surface 132a side of the charged body 284. The positive charge and the negative charge accumulated in the second substrate 131 by the negative charge supply device 280 attract each other; as a result, a part of the second substrate 131 is fixed to the charged body 284, that is, the support 132. Thereafter, the connection pin 286 is disconnected from the connecting portion 285, and the support 132 to which the second substrate 131 is fixed is transported by the driving mechanism 221 successively.

After the first substrate 150 and the second substrate 131 are attached to each other by the substrate attaching device 250, in order to release the optical disk 130 from the support 132, the switch 293 in the power source 290 for applying a voltage is switched to the ground terminal 292 in the substrate transporting device 260, and the connection pin 286 is connected to the connecting portion 285 again. Simultaneously with the connection, the positive charge in the electrode 283 moves to the ground through the ground terminal 292, and polarization in the charged body 284 is finished. Consequently, the other principal plane 131b of the second substrate 131 is released from the support 132. Thus, the optical disk 130 is released.

As described above, according to the method for fixing the second substrate 131 using static electricity, the optical disk producing apparatus 200 includes, as means for fixing the second substrate 131, a static electricity generating device including the negative charge supply device 280, the electrode 283 and the charged bodies 284 buried in the support 132 and the power source 290 for applying a voltage. According to this method, the charged bodies 284 in the support 132 are charged or discharged under the condition that the second substrate 131 is charged, whereby the second substrate 131 can be fixed onto the support 132 or released therefrom with ease.

It is preferable that the exposed surfaces of the charged bodies 284 are flat and have no step with respect to the surface 132a of the support 132. Because of this, when the second substrate 131 is fixed to the support 132, the second substrate 131 can be prevented from being deformed locally. If the second substrate 131 having a local deformation is fixed to the support 132 and attached to the first substrate 150, the completed optical disk 130 also has a similar local deformation. Furthermore, it is preferable that the pattern of exposed portions of the charged bodies 284 seen from the surface 132a side is in a concentric shape whose central axis is equal to that of the support 132. If the exposed portions have a concentric pattern, when the second substrate 131 is fixed, the second substrate 131 can be prevented from being deformed locally in a track direction.

Figure 17A:
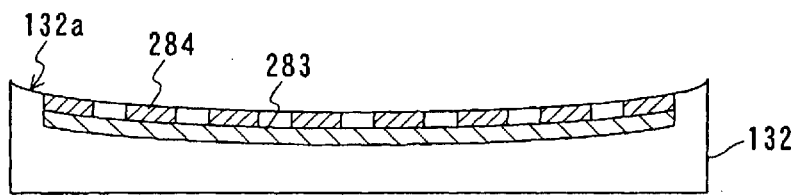
FIGS. 17A and 17B are schematic cross-sectional views showing an example of constituent components of an apparatus for producing an optical disk of the present invention.
Figure 17B:
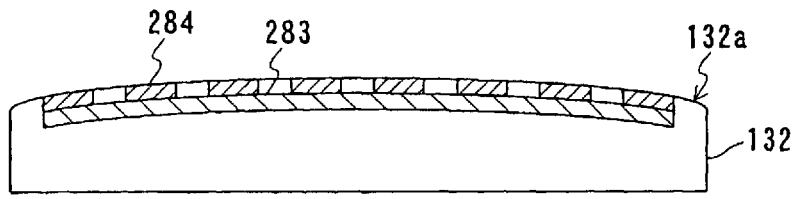

Furthermore, it is preferable that the shape of the surface 132a in a radius direction should be selected so that the warp of the completed optical disk 130 becomes minimum (this also applies to the following embodiment). For example, if it is assumed that, in the attachment process, the optical disk 130 is likely to have a shape in which the second substrate 131 side is dented due to curing characteristics of an attachment material such as UV-curable resin, it is preferable to prescribe the cross-sectional shape of the surface 132a to be as shown in FIG. 17A. This allows the shape of the completed optical disk to be flat. In contrast, assuming that the completed optical disk 130 is likely to have a shape in which the first substrate 150 side is dented, if the shape of the surface 132a in a radius direction is prescribed to be as shown in FIG. 17B, the shape of the completed optical disk 130 can be made flat.

In the optical disk producing apparatus of Embodiment 5, an optical disk can be produced easily in accordance with the method for producing an optical disk described in Embodiment 4. Therefore, according to the optical disk producing apparatus of Embodiment 5, an optical disk without any warp and wave can be produced easily.

In Embodiment 5, the case where the concentric charged bodies 284 are buried in the support 132 has been described. However, the charged bodies 284 are not necessarily in a concentric shape. For example, the charged bodies 284 may be exposed over the entire surface that is in contact with the second substrate 131.

Furthermore, in Embodiment 5, the case where the substrates are attached to each other using radiation-curable resin has been described. However, it also may be possible to use an apparatus for attaching substrates with a hot-melt material, an apparatus for attaching substrates with a slow-acting material that is cured gradually after an elapse of time triggered by irradiation with UV-light, or an apparatus for attaching substrates with a film made of an adhesive material (this also applies to the following embodiment).

Furthermore, in Embodiment 5, the case where a circular through-hole is not formed at the center of the second substrate 131 has been described. It is appreciated that a circular through-hole may be formed at the center of the second substrate 131.

Furthermore, as described in Embodiment 6, it also is appreciated that the first substrate 150 may have a signal area.

Furthermore, the producing apparatus of Embodiment 5 further may include means for forming a signal area (this also applies to the apparatus of Embodiment 6). According to this configuration, after the second substrate without a signal area SA is fixed to the support, a signal area can be formed on the second substrate. An example of means for forming a signal area includes an apparatus (2P unit) for conducting a photopolymer method. The 2P unit includes, for example, a coating device for coating the second substrate with photopolymer resin, and a transfer device for transferring the pattern of a mask. As the coating device, a nozzle, a screen printing device (screen and spatula), a roller or the like can be used. Furthermore, as the transfer device, a master with a predetermined pattern formed thereon, a UV irradiation device, and a unit for peeling the master off the second substrate after irradiation with UV-light.

Embodiment 6

In Embodiment 6, another example of an optical disk producing apparatus of the present invention will be described. The optical disk producing apparatus of Embodiment 6 is different from that described in Embodiment 5 only in the fixing means (fixing mechanism) of the second substrate 131. Therefore, repeated description of the same portions as those described in the above embodiment may be omitted In Embodiment 6, the case where the second substrate 131 has a circular through-hole 131h (see FIG. 14B) at the center will be exemplified. Furthermore, in Embodiment 6, a single-sided two-layer optical disk will be exemplified, in which a first substrate also has a signal area on the surface of the second substrate side, and information can be recorded and reproduced with respect to a recording layer on the second substrate and a recording layer on the first substrate by irradiation with laser light from the second substrate side.

The optical disk producing apparatus of Embodiment 6 includes, as fixing means for fixing the other principal plane 131b of the second substrate 131 to the support 132, pressure means for pressing at least one selected from the inner peripheral edge 131s and the outer peripheral edge 131t (see FIG. 14B) of the second substrate 131 to the support 132 side. It is preferable that the optical disk producing apparatus of Embodiment 6 includes, as fixing means for fixing the other principal plane 131b to the support 132, second fixing means different from the pressure means. As the second fixing means, for example, at least one selected from a vacuum adsorption device and a static electricity generating device can be used.

Figure 18A:
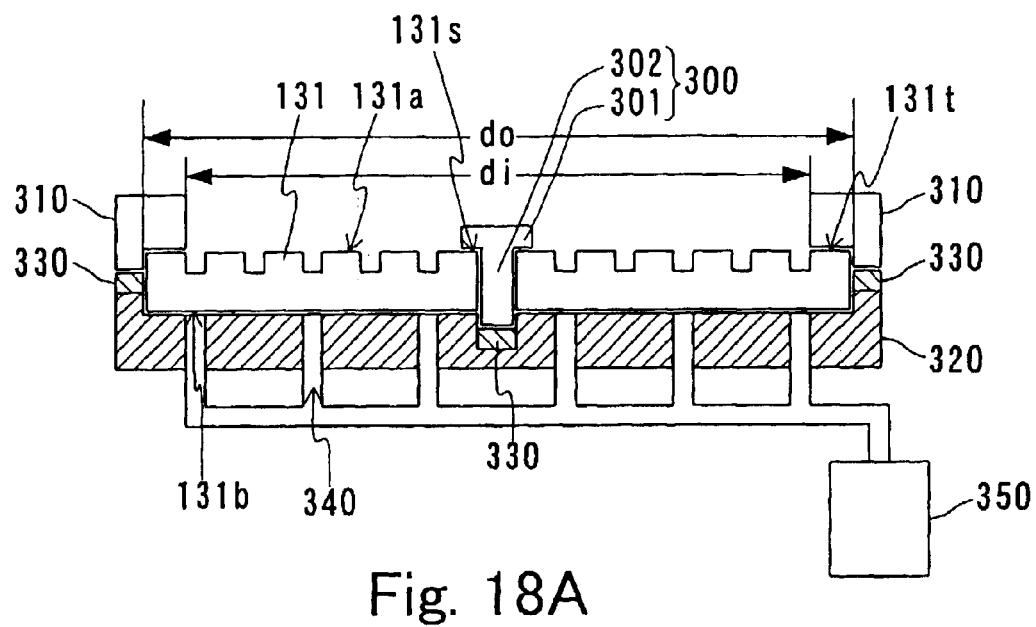
FIGS. 18A and 18B are schematic views illustrating an example of processes of a method for producing an optical disk using the apparatus for producing an optical disk of the present invention.
Figure 18B:
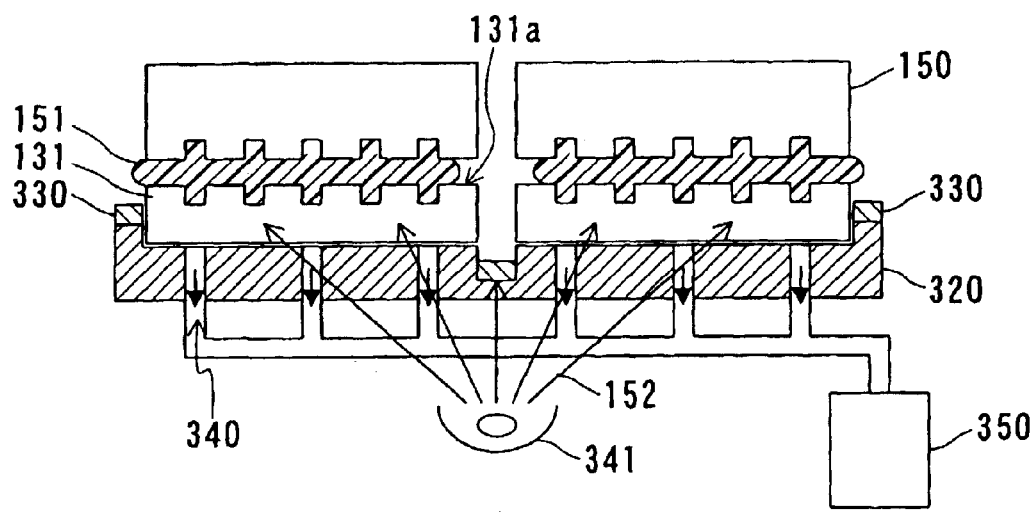

FIGS. 18A and 18B show a fixing mechanism of the second substrate 131 in the optical disk producing apparatus of Embodiment 6.

As shown in FIG. 18A, the second substrate 131 (thickness is preferably 0.3 mm or less (e.g., 0.05 mm, 0.1 mm or 0.2 mm) is fixed by pressing the inner peripheral edge 131s onto a support 320 from one principal plane (signal plane) 131a side by an inner periphery pressure member 300 and by pressing the outer peripheral edge 131t to the support 320 from one principal plane (signal plane) 131a side by an outer periphery pressure member 310.

The inner periphery pressure member 300 includes a circular disk portion and a columnar portion 302 connected to the disk portion 301. The disk portion 301 has a diameter larger than that of a circular through-hole 131h positioned at the center of the second substrate 131, which does not reach the signal area SA. Furthermore, the columnar portion 302 has a size that can be inserted into the through-hole 131h. The columnar portion 302 is inserted into the through-hole 131h, and is inserted into a hole provided at the center of the support 320.

The outer periphery pressure member 310 has a shape in which a flat plate ring with a large inner diameter and a flat plate with a small inner diameter are attached to each other concentrically. A small inner diameter "$d_i$" of the outer periphery pressure member 310 is smaller than an outer diameter of the second substrate 131. Furthermore, a large inner diameter "$d_o$" of the outer periphery pressure member 310 is larger than the outer diameter of the second substrate 131.

The inner periphery pressure member 300 and the outer periphery pressure member 310 are made of a magnetic substance, and stainless steel can be used, for example. Permanent magnets 330 are attached to portions of the support 320 that the inner periphery pressure member 300 and the outer periphery pressure member 310 are in contact with, and the permanent magnets 330 fix the inner periphery pressure member 300 and the outer periphery pressure member 310 made of a magnetic substance to the support 320. More specifically, the optical disk producing apparatus of Embodiment 6 includes, as fixing means for fixing the other principal plane 131b of the second substrate 131 to the support 320, the inner periphery pressure member 300, the outer periphery pressure member 310 and the permanent magnets 330, and fixes the other principal plane 131b to the support 320 by using a magnetic force. Electromagnets may be used in place of the permanent magnets.

The disk portion 301 of the inner periphery pressure member 300 and the outer periphery pressure member 310 can be used not only as the fixing means for fixing the second substrate 131 to the support 320, but also as a mask during formation of a recording/reflective film. In this case, a mask is not required for the film-forming device 230. Generally, in production of an optical disk, a recording/reflective film also is deposited onto a mask, so that it is required to replace a mask in a chamber of the film-forming device 230 regularly. However, in this case, the chamber is exposed to the atmosphere every time the mask is replaced, which requires evacuation of the chamber after the mask is replaced, resulting in a decrease in productivity. However, if the inner periphery pressure member 300 and the outer periphery pressure member 310 are used as a mask as described above, the mask can be replaced easily outside of the chamber, and a down time for exposure to the atmosphere and evacuation of the chamber can be shortened, which can enhance productivity.

The support 320 includes a plurality of aspiration holes 340, and the aspiration holes 340 are connected to a discharge device 350, such as a vacuum pump, through a tube. More specifically, the optical disk producing apparatus of Embodiment 6 includes, as fixing means, aspiration holes 340 formed in the support 320 and the discharge device 350, in addition to the pressure means. In the optical disk producing apparatus of Embodiment 6, it is required that the inner periphery pressure member 300 and the outer periphery pressure member 310 are removed so as to attach the second substrate 131 and the first substrate 150 to each other after the second substrate 131 is fixed by the inner periphery pressure member 300 and the outer periphery pressure member 310, and a recording/reflective film is formed on a signal area SA by the film-forming device 230. In this case, if the second substrate 131 is held under vacuum through the aspiration holes 340 before the inner periphery pressure member 300 and the outer periphery pressure member 310 are removed, and the inner periphery pressure member 300 and the outer periphery pressure member 310 are removed under the condition that the second substrate 131 is fixed to the support 320, a warp and a wave of the second substrate 131 can be suppressed. The vacuum adsorption device also can be used for fixing the second substrate 131 together with the pressure member, in the case where the second substrate 131 is not fixed sufficiently by the inner periphery pressure member 300 and the outer periphery pressure member 310.

In the optical disk producing apparatus of Embodiment 6, it is preferable that the support 320 is made of a material having UV-permeability such as quartz glass, and a UV-light irradiation lamp is provided below the support 320 (on the side opposite to the second substrate 131 with respect to the support 320). According to this configuration, even in the case of using the first substrate 150 including a recording/reflective film substantially having no UV-permeability as a signal layer, UV-light is radiated from the support 320 side, whereby UV-curable resin placed between the second substrate 131 and the first substrate 150 can be cured. FIG. 18B shows the process at this time.

As shown in FIG. 18B, the second substrate 131 with the inner periphery pressure member 300 and the outer periphery pressure member 310 removed therefrom is fixed to the support 320 by vacuum adsorption using the aspiration holes 340. By irradiating the radiation 152 such as UV-light from the support 320 side, the radiation-curable resin 151 placed between the second substrate 131 and the first substrate 150 is cured. The radiation 152 is radiated from a radiation irradiation device (irradiation means) 341 such as a mercury lamp, a metal halide lamp, and a rare gas lamp.

Thus, in the optical disk producing apparatus of Embodiment 6, a single-sided two-layer optical disk can be produced easily in which the second substrate 131 and the first substrate 150 are integrated with each other.

Figure 19A:
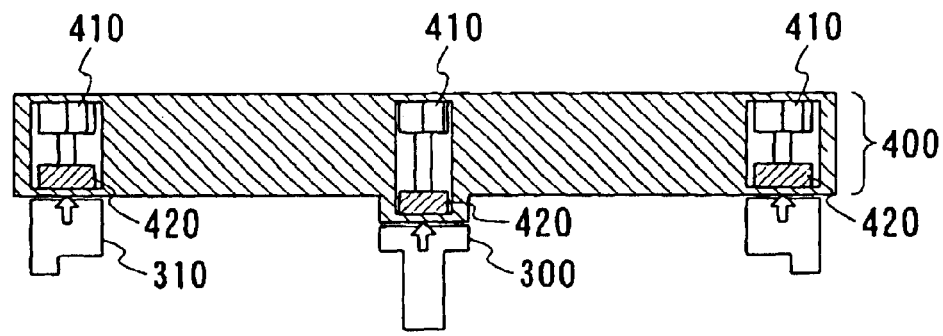
FIGS. 19A and 19B are schematic views showing a function of an example of constituent components of the apparatus for producing an optical disk of the present invention.
Figure 19B:
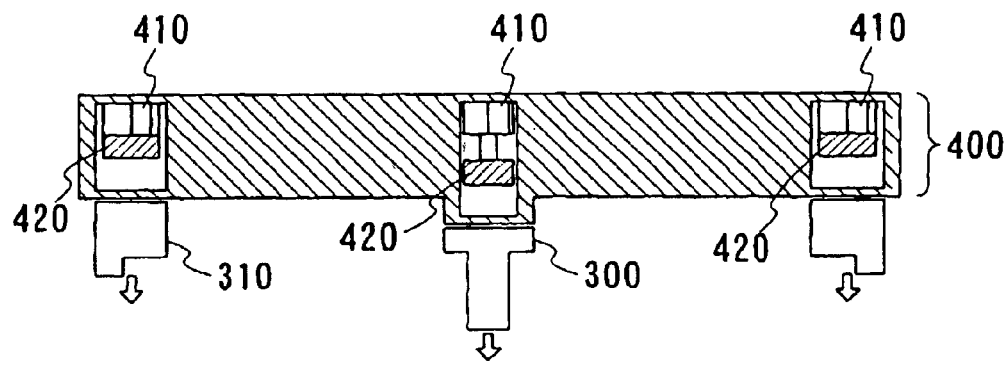

FIGS. 19A and 19B schematically show a configuration of a pressure member transport arm 400 for fixing and releasing the second substrate 131, using the inner periphery pressure member 300 and the outer periphery pressure member 310. The pressure member transport arm 400 includes air cylinders 410 and permanent magnets 420 fixed to shafts of the air cylinders 410. The magnetic force of the permanent magnets 420 is stronger than that of the permanent magnets 330 on the support 320.

When the inner periphery pressure member 300 and the outer periphery pressure member 310 are removed from the support 320, the shafts of the air cylinders 410 move downward (in the direction where the inner periphery pressure member 300 and the outer periphery pressure member 310 are placed), and the permanent magnets 420 approach the inner periphery pressure member 300 and the outer periphery pressure member 310. The magnetic force of the permanent magnets 420 is stronger than that of the permanent magnets 330, so that the inner periphery pressure member 300 and the outer periphery pressure member 310 are removed from the support 320, and held by the pressure member transport arm 400 (see FIG. 19A).

In contrast, when the inner periphery pressure member 300 and the outer periphery pressure member 310 are transferred from the pressure member transport arm 400 to the support 320, the shaft of the air cylinder 410 moves upward (in the direction opposite to the direction where the inner periphery pressure member 300 and the outer periphery pressure member 310 are placed). Therefore, the permanent magnets 420 move away from the inner periphery pressure member 300 and the outer periphery pressure member 310 (see FIG. 19B). As a result, the inner periphery pressure member 300 and the outer periphery pressure member 310 are fixed to the support 320 by a magnetic force of the permanent magnets 330 on the support.

As described above, in Embodiment 6, an optical disk producing apparatus and a method using the same have been described, in which a pressure member is used as a method for fixing the second substrate to the support before formation of a recording/reflective film, and the pressure member is moved between the support and the pressure member transport arm by permanent magnets. However, according to the optical disk producing method and apparatus of the present invention, as a method for fixing a pressure member to a support or a pressure member transport arm, a method and mechanism may be used in which holes for vacuum adsorption are provided on the surface in contact with the support and the pressure member of the pressure member transport arm, and the pressure member is fixed to the support and the pressure member transport arm by vacuum adsorption.

Furthermore, as a method for fixing the second substrate to the support before the pressure member is removed from the support after formation of a recording/reflective film, a method and mechanism may be used in which a charged substance is provided on the support, and the second substrate is fixed to the support by static electricity of the charged substance.

According to the optical disk producing apparatus of Embodiment 6, an optical disk can be produced by the method for producing an optical disk described in Embodiment 4. Therefore, an optical disk without any warp and wave can be produced easily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

Industrial Applicability

As described above, according to the method for producing a disk-shaped substrate of the present invention, it is possible to produce a disk-shaped substrate whose surface is unlikely to be damaged and which can be handled easily. The disk-shaped substrate can be used for producing an optical disk obtained by attaching two substrates.

Furthermore, according to the first and second producing methods of the present invention for producing an optical disk, an optical disk can be produced easily in which the surface of a substrate on a light-incident side is unlikely to be damaged.

Furthermore, according to the first and second producing apparatus for producing an optical disk, the first and second production methods of the present invention can be conducted easily.

What is claimed is:

1. A method for producing optical disk including a first substrate and a second substrate in which a signal area is to be formed on one principal plane, comprising the processes of:
   (i) fixing the other principal plane of the second substrate, which is an opposite side of the one principal plane, to a support;
   (ii) forming at least one film selected from a metal film, a dielectric film, a magnetic film and a coloring film on the one principal plane;
   (iii) forming at least one film selected from a metal film, a dielectric film, a magnetic film and a coloring film on the one principal plane;
   (iv) attaching the first substrate and the second substrate to each other with the at least one film interposed therebetween; and
   (v) releasing the other principal plane of the second substrate from the support,
   wherein the processes are performed in an order of (i), (ii), (iii), (iv), and (v).

2. A method for producing an optical disk according to claim 1, wherein a thickness of the second substrate is in a range of 0.03 mm to 0.3 mm.

3. A method for producing an optical disk according to claim 1, wherein the first substrate includes a signal area on one principal plane on a side that is attached to the second substrate.

4. A method for producing an optical disk according to claim 1, wherein the first substrate and the second substrate are attached to each other using radiation-curable resin in the process (iv).

5. A method for producing an optical disk according to claim 4, wherein the support and the second substrate have radiation permeability, and the first substrate and the second substrate are attached to each other by curing the radiation-curable resin by radiation from the support side in the process (iv).

6. A method for producing an optical disk according to claim 1, wherein the second substrate has a circular through-hole at a center thereof; and the process (i) includes pressing at least one selected from an inner peripheral edge and an outer peripheral edge of the second substrate to the support side by a pressure member, thereby fixing the other principal plane to the support.

* * * * *

UNITED STATES PATENT AND TRADEMARK OFFICE
CERTIFICATE OF CORRECTION

PATENT NO.        : 7,101,593 B2                                    Page 1 of 1
APPLICATION NO.   : 10/258702
DATED             : September 5, 2006
INVENTOR(S)       : Hayashi et al.

It is certified that error appears in the above-identified patent and that said Letters Patent is hereby corrected as shown below:

TITLE PAGE, ITEM (56) FOREIGN PAT. DOCS.:
Second page, second column, line 3: "JP 2-12042" should read --JP 2-172042--.
Column 26, lines 9-11(claim 1 ii): "forming at least one film selected from a metal film, a dielectric film, a magnetic film and a coloring film on the one principal plane" should read --forming the signal area on the one principal plane of the second substrate--.

Signed and Sealed this

Eighteenth Day of March, 2008

JON W. DUDAS
*Director of the United States Patent and Trademark Office*